United States Patent
Nakayama et al.

(10) Patent No.: US 8,084,082 B2
(45) Date of Patent: Dec. 27, 2011

(54) OPTICAL MEMBER, OPTICAL SYSTEM USING THE OPTICAL MEMBER, AND METHOD OF MANUFACTURING AN OPTICAL MEMBER

(75) Inventors: Tomonari Nakayama, Yokohama (JP); Masayuki Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 12/544,271

(22) Filed: Aug. 20, 2009

(65) Prior Publication Data

US 2009/0304929 A1 Dec. 10, 2009

Related U.S. Application Data

(60) Division of application No. 12/180,987, filed on Jul. 28, 2008, now Pat. No. 7,771,832, which is a continuation of application No. PCT/JP2008/053129, filed on Feb. 19, 2008.

(30) Foreign Application Priority Data

Feb. 20, 2007 (JP) ................... 2007-040003
Feb. 14, 2008 (JP) ................... 2008-033290

(51) Int. Cl.
*B05D 5/06* (2006.01)
(52) U.S. Cl. ............... 427/162; 427/331; 427/419.2; 428/473.5; 428/702
(58) Field of Classification Search .......... 427/162, 427/331, 419.2; 428/473.5, 702
See application file for complete search history.

(56) References Cited

U.S. PATENT DOCUMENTS

| | | | |
|---|---|---|---|
| 4,013,465 A | 3/1977 | Clapham et al. | 96/36 |
| 4,190,321 A | 2/1980 | Dorer et al. | 350/165 |
| 4,690,857 A | 9/1987 | Shirahata et al. | 428/216 |
| 5,693,415 A | 12/1997 | Zait et al. | 428/332 |
| 6,663,957 B1 | 12/2003 | Takushima et al. | |
| 2005/0233113 A1 | 10/2005 | Kotani et al. | 428/141 |
| 2006/0154044 A1* | 7/2006 | Yamada et al. | 428/312.2 |
| 2006/0199040 A1* | 9/2006 | Yamada et al. | 428/701 |

(Continued)

FOREIGN PATENT DOCUMENTS

EP    1 574 881 A1    9/2005

(Continued)

OTHER PUBLICATIONS

PCT International Search Report in Application No. PCT/JP2008/053129 (with translation).

(Continued)

*Primary Examiner* — Timothy Meeks
*Assistant Examiner* — Elizabeth Burkhart
(74) *Attorney, Agent, or Firm* — Fitzpatrick, Cella, Harper & Scinto

(57) ABSTRACT

Provided is an optical member capable of keeping a high performance antireflection effect over a long period of time with respect to an arbitrary substrate. The optical member has plural layers on a substrate, and includes at least one metal oxide layer having a void, and at least one layer containing an organic resin as a main component formed between the substrate and the metal oxide layer. The metal oxide layer is a plate crystal layer formed of a plate crystal containing aluminum oxide as a main component and a surface of the plate crystal layer has an uneven profile. The organic resin has an aromatic ring and/or a hetero ring in at least a part thereof.

6 Claims, 12 Drawing Sheets

U.S. PATENT DOCUMENTS

| | | | |
|---|---|---|---|
| 2008/0176038 A1 | 7/2008 | Zhang et al. | 428/141 |
| 2008/0305254 A1 | 12/2008 | Tanaka et al. | 427/162 |
| 2009/0022954 A1 | 1/2009 | Kotani et al. | 428/148 |

FOREIGN PATENT DOCUMENTS

| | | |
|---|---|---|
| EP | 1 693 689 A1 | 8/2006 |
| JP | 50-70040 | 6/1975 |
| JP | 61-162001 | 7/1986 |
| JP | 61-48124 B2 | 10/1986 |
| JP | 3-193442 | 8/1991 |
| JP | 9-202649 | 8/1997 |
| JP | 2000-66004 | 3/2000 |
| JP | 3135944 B2 | 2/2001 |
| JP | 2005-275372 | 10/2005 |
| JP | 2005-275372 A | 10/2005 |
| JP | 2005-350622 | 12/2005 |
| JP | 2006-259711 | 9/2006 |

OTHER PUBLICATIONS

Sep. 3, 2009 International Preliminary Report on Patentability in International Patent Appln. No. PCT/JP2008/053129.

Naoko Yamaguchi, et al., "Formation of anti reflective alumina films on polymer substrates by the sol gel process with hot water treatment", Surface and Coatings Technology, Elsevier, Amsterdam, NL, vol. 201, No. 6, Dec. 4, 2006, pp. 3653-3657.

Oct. 12, 2011 European Search Report in European Patent Appln. No. 08711893.1.

* cited by examiner

OPTICAL MEMBER, OPTICAL SYSTEM USING THE OPTICAL MEMBER, AND METHOD OF MANUFACTURING AN OPTICAL MEMBER

CROSS-REFERENCE TO RELATED APPLICATIONS

This application is a division of application Ser. No. 12/180,987 filed Jul. 28, 2008, which is a continuation of International application No. PCT/JP2008/053129, filed Feb. 19, 2008, which claims the benefit of Japanese patent applications No. 2007-040003, filed Feb. 20, 2007, and No. 2008-033290, filed Feb. 14, 2008.

BACKGROUND OF THE INVENTION

1. Field of the Invention

The present invention relates to an optical member having an antireflection property and an optical system using the same, and more particularly, to an optical member suitable for obtaining a high antireflection property in a visible region to a near infrared region over a long period of time, and an optical system using the same.

2. Description of the Related Art

It is known that an antireflection structure using a fine periodic structure having a wavelength of the visible light region or a shorter wavelength forms a fine periodic structure having an appropriate pitch and height, and thereby shows an excellent antireflection property in a wide wavelength region. As a method for forming a fine periodic structure, coating of a film in which fine particles having a particle diameter equal to or less than the wavelength are dispersed (Japanese Patent No. 03,135,944) or the like is known.

Further, it is known that a method of forming a fine periodic structure by formation of a pattern by a finely processing apparatus (electron beam lithography apparatus, laser interference light exposure apparatus, semiconductor light exposure apparatus, etching apparatus, etc.) allows a pitch and a height to be controlled, and enables the formation of the fine periodic structure having an excellent antireflection property (Japanese Patent Application Laid-Open No. S50-70040).

As methods other than the methods described above, methods of growing boehmite that is an oxide hydroxide of aluminum on a substrate to obtain an antireflection effect are known. In those methods, a layer of aluminum oxide (alumina) formed by the vacuum film formation process (Japanese Patent Publication No. S61-48124) or the liquid phase process (sol-gel process) (Japanese Patent Application Laid-Open No. H09-202649) is subjected to water vapor treatment or hot water dipping treatment to form a surface layer into boehmite to form a fine periodic structure, and thereby an antireflection film is obtained.

Further, an antireflection film in which a film which contains $SiO_2$ as a main component and has a refractive index between that of a substrate and that of boehmite is provided between the substrate and the boehmite has been proposed (Japanese Patent Application Laid-Open No. 2006-259711).

SUMMARY OF THE INVENTION

A metal oxide and a metal halide layer to be formed by a technology using fine particles or a method of growing boehmite on a substrate is produced easily with a high productivity and exhibits excellent optical characteristics. On the other hand, such a metal oxide and a metal halide layer have a low density and a number of voids, so moisture or the like reaches the substrate easily from outside, which easily causes the erosion of the substrate and the elution of a substrate component such as alkali ions. Further, there is a problem in that the eluted component makes it difficult to keep the fine structure, resulting in decreased performance.

Further, in an antireflection film including a film containing $SiO_2$ as a main component between a substrate and boehmite, a film component is eluted from the film containing $SiO_2$ as a main component due to hot water treatment, which changes optical characteristics.

There is a demand for an antireflection film using a fine periodic structure, which can be formed more easily and has high reliability in low-temperature sintering.

The present invention has been made in view of the related art described above, and an object is to provide an optical member which can maintain a high-performance antireflection effect over a long period of time for any substrate, an optical system using the same and a method of manufacturing an optical member.

The present invention provides an optical member configured in a manner described below for achieving the above-mentioned object.

The present invention provides an optical member having plural layers formed on a substrate, including at least one plate crystal layer formed of a plate crystal containing aluminum oxide as a main component, and at least one layer containing an organic resin as a main component formed between the substrate and the plate crystal layer, the organic resin including an aromatic ring and/or an imide ring in a main chain.

Further, the present invention provides the optical member, in which the plate crystal is boehmite.

Further, the present invention provides the optical member, in which the plate crystal layer has a refractive index that continuously increases from a surface layer side to a substrate side.

Further, the present invention provides the optical member, in which a surface of the plate crystal layer has an uneven profile.

Further, the present invention provides the optical member, in which a percentage of water absorption of the organic resin is 0.05% or more and 2% or less.

Further, the present invention provides the optical member, in which the organic resin is a thermoplastic resin.

Further, the present invention provides the optical member, in which at least a part of the organic resin has a repeating unit $(-SiR_2-O-)_m$, where R is a methyl group or a phenyl group, and m is an integer of 1 or more and 6 or less.

Further, the present invention provides the optical member, in which the refractive index nb of the substrate, the refractive index ni of the layer containing the organic resin as a main component, and the refractive index ns of the plate crystal layer formed of a plate crystal containing the aluminum oxide as a main component satisfy $nb \geq ni \geq ns$.

Further, the present invention provides the optical member, in which the thickness of the layer containing the organic resin as a main component is 10 nm or more and 150 nm or less.

Further, the present invention provides the optical member, in which the substrate is made of glass.

Further, the present invention provides an optical system including the optical member according to any one of the above-described ones.

Further, the present invention provides a method of manufacturing an optical member, including: forming a layer containing an organic resin as a main component on a substrate; forming a layer containing aluminum oxide as a main component; and subjecting the layer containing aluminum oxide as a main component to hot water treatment to form unevenness on a surface, characterized in that the refractive index nb of the substrate, the refractive index ni of the layer containing an organic resin as a main component, and the refractive index ns of the layer containing aluminum oxide as a main component satisfy nb≧ni≧ns.

According to the present invention, an optical member capable of exhibiting a high antireflection effect stably over a long period of time can be provided.

Further, according to the present invention, an optical system having the above optical member can be provided.

DESCRIPTION OF THE EMBODIMENTS

Hereinafter, the present invention will be described.

Figure 1:
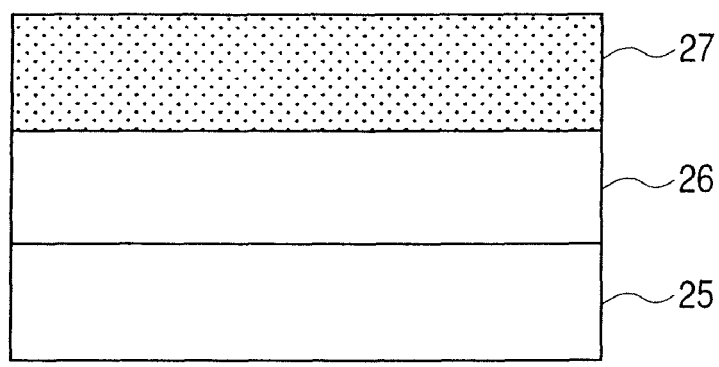
FIG. 1 is a schematic diagram illustrating one embodiment of an optical transparent element of the present invention.

FIG. 1 is a schematic cross-sectional view schematically illustrating an optical member according to the embodiment of the present invention. As shown in FIG. 1, in the optical member of the present invention, a laminated structure including a layer 26 containing an organic resin as a main component and a plate crystal layer 27 formed of a plate crystal containing aluminum oxide as a main component formed on the surface of the layer 26 is formed on the surface of a substrate 25. The plate crystal forming the plate crystal layer 27 that is one layer of the laminated structure refers to a plate crystal that is deposited and grows on the surface layer of a film containing aluminum oxide as a main component when the film is soaked in hot water and then the surface layer of the aluminum oxide film is subjected to a deflocculating action or the like.

Figure 2:
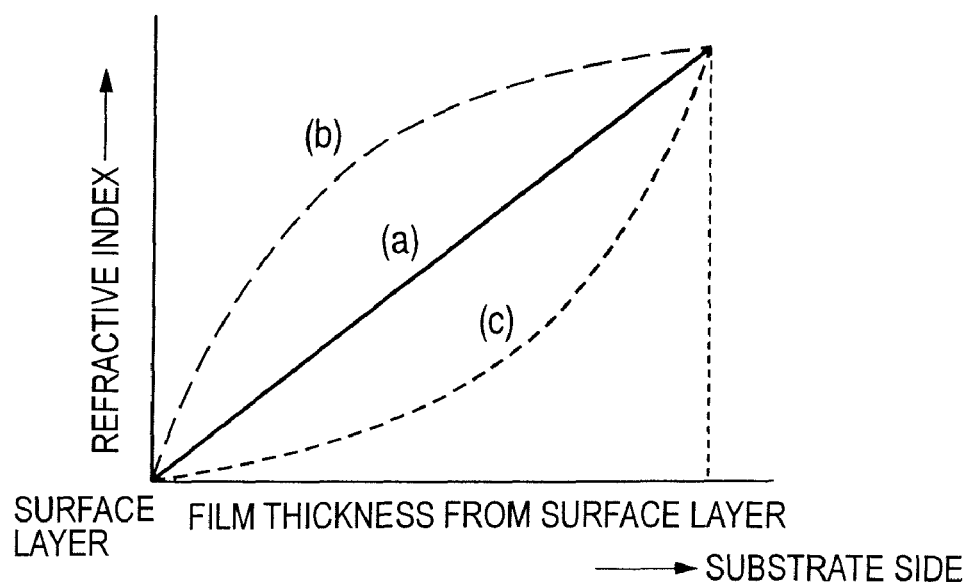
FIG. 2 is a schematic diagram illustrating one embodiment of a refractive index profile of an optical transparent element of the present invention.

The plate crystal layer 27 is preferably a layer of which the refractive index continuously increases from the surface layer side to the substrate side, and a change in the refractive index with respect to the film thickness can be represented by a straight line (a) or a curve (b) or (c) as shown in FIG. 2. Due to the continuous increase in the refractive index from the surface layer side to the substrate side, a reflectance reduction effect is larger compared with the case where a layer having higher refractive index is laminated subsequently from the surface layer side.

Figure 3A:
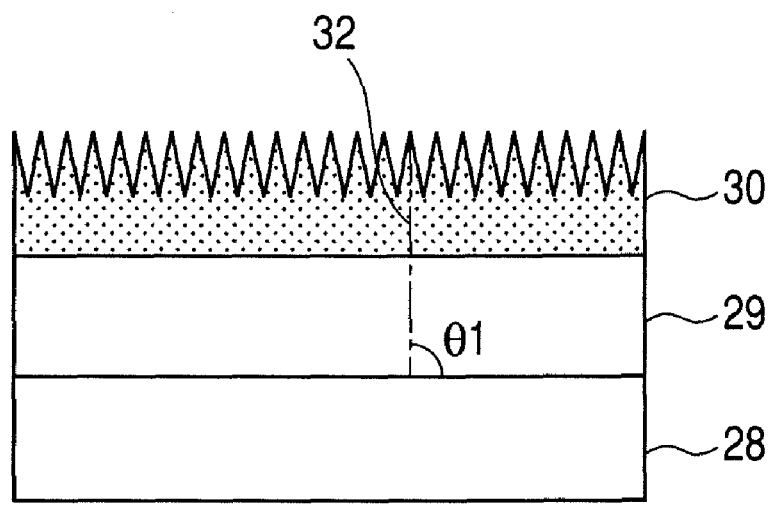
FIGS. 3A and 3B are each a schematic diagram illustrating one embodiment of an optical transparent element of the present invention.
Figure 3B:
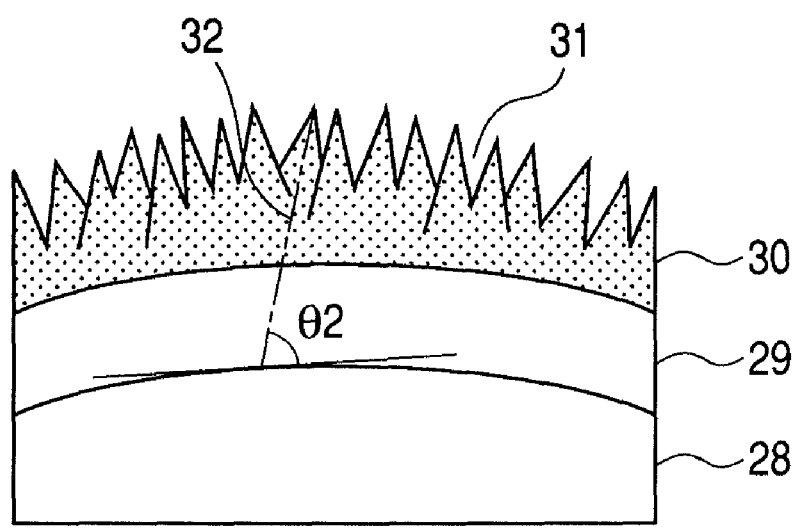

Further, the refractive index of the plate crystal layer 27 continuously increases from the surface layer side to the substrate side, so it is preferred that the surface have an uneven profile. FIGS. 3A and 3B are schematic cross-sectional views schematically illustrating an optical member according to the embodiment of the present invention in this case.

In FIGS. 3A and 3B, the optical member of the present invention has a layer 29 containing an organic resin as a main component and a plate crystal layer 30 formed of a plate crystal containing aluminum oxide as a main component on the substrate 28.

The surface of the plate crystal layer 30 has an uneven profile 31.

The plate crystal layer 30 containing aluminum oxide as a main component are formed of a crystal containing an oxide or a hydroxide of aluminum or a hydrate thereof as a main component. Especially preferred crystals are boehmite. By placing these plate crystals, their end portions form fine unevenness 31, and therefore it is preferred that the plate crystals be selectively arranged with a predetermined angle to the surface of a layer for increasing the height of the fine unevenness and reducing the intervals therebetween. In the present application, an oxide or hydroxide of aluminum, or a hydrate thereof is referred to as aluminum oxide. Further, one or more oxide layers, which contain aluminum oxide alone or any of $ZrO_2$, $SiO_2$, $TiO_2$, $ZnO$, and $MgO$, and of which the amount of aluminum oxide is 70 mol % or more, may be referred to as a layer containing aluminum oxide as a main component.

A case where the surface of the substrate 28 is a flat surface such as flat plate, a film, or a sheet is shown in FIG. 3A. It is preferred that the plate crystal be arranged with respect to the surface layer of the substrate with an average angle of an angle θ1, between an inclination direction 32 of the plate crystal and the substrate surface, of 45° or more and 90° or less, and more preferably 60° or more and 90° or less.

Further, a case where the surface of the substrate 28 has a two-dimensional or three-dimensional curved surface is shown in FIG. 3B. It is preferred that the plate crystal be arranged with respect to the surface layer of the substrate with an average angle of an angle θ2, between an inclination direction 32 of the plate crystal and the substrate surface, of 45° or more and 90° or less, and more preferably 60° or more and 90° or less. Note that there may be a case where the value of the angles θ1 and θ2 exceeds 90° depending on the gradient of the plate crystals. In this case, measurement is conducted so that the value is 90° or less.

The thickness of the plate crystal layer 30 is preferably 20 nm or more and 1,000 nm or less, more preferably 50 nm or more and 1,000 nm or less. If the thickness of the layer forming the unevenness is 20 nm or more and 1,000 nm or less, an antireflection property owing to a fine uneven configuration is effective, the possibility that the mechanical strength of the unevenness is impaired is eliminated and the fine uneven configuration becomes advantageous in terms of manufacturing costs. By setting the thickness to 50 nm or more and 1,000 nm or less, the antireflection property is further improved, which is more preferred.

The surface density of the fine unevenness of the present invention is also important, and the corresponding average surface roughness Ra' value obtained by two-dimensional extension of a center line average roughness is 5 nm or more, more preferably 10 nm or more, still more preferably 15 nm or more and 100 nm or less, and the surface area ratio Sr is 1.1 or more, more preferably 1.15 or more, still more preferably 1.2 or more and 3.5 or less.

One method for evaluating an obtained fine uneven structure is observation of the surface of the fine uneven structure by a scanning probe microscope, and by the observation, the average surface roughness Ra' value obtained by two-dimensional extension of the center line average roughness Ra of the film and the surface area ratio Sr are determined. Namely, the average surface roughness, Ra' value (nm), is such a value that the center line average roughness Ra defined in JIS B 0601 is applied to a measurement surface and three-dimensionally extended, and the Ra' value is expressed as a "value obtained by averaging absolute values of deviations from a reference surface to a specified surface" and given by the following formula (1).

$$Ra' = \frac{1}{S_0} \int_{Y_L}^{Y_T} \int_{X_L}^{X_R} |F(X \cdot Y) - Z_0| d_x d_y \quad (1)$$

Ra': average surface roughness value (nm),
$S_0$: area when the measurement surface is ideally flat,
$|X_R - X_L| \times |Y_T - Y_B|$, F(X, Y): height at a measurement point (X, Y), where X is an X coordinate and Y is a Y coordinate,
$X_L$ to $X_R$: range of X coordinates on the measurement surface,
$Y_B$ to $Y_T$: range of Y coordinates on the measurement surface, and
$Z_0$: average height within the measurement surface.

The surface area ratio Sr is determined by Sr=S/$S_0$ ($S_0$: area when the measurement surface is ideally flat. S: surface area of an actual measurement surface). The surface area of an actual measurement surface is determined as follows. The measurement surface is divided into minute triangles consisting of closest three data points (A, B, C), and then the area ΔS of each minute triangle is determined using a vector product. ΔS (ΔABC)=[s(s−AB)(s−BC)(s−AC)] 0.5 (where AB, BC and AC are the lengths of the sides, and thus s≡0.5 (AB+BC+AC)), and the total sum of the areas ΔS is a surface area S to be determined. If Ra' as the surface density of the fine unevenness is 5 nm or more and Sr is 1.1 or more, antireflection owing to the uneven configuration can be realized. If Ra' is 10 nm or more and Sr is 1.15 or more, the antireflection effect becomes higher than that of the former case. If, Ra' is 15 nm or more and Sr is 1.2 or more, the uneven configuration has a performance capable of enduring practical use. However, if Ra' is 100 nm or more and Sr is 3.5 or more, the effect of scattering by the uneven configuration predominates over the antireflection effect so that a sufficient antireflection property cannot be obtained.

The plate crystal layer 30 formed of a plate crystal containing aluminum oxide as a main component in the present invention is obtained by compounding an Al metal alone film or a metal film containing metal Al and one of metal Zn or metal Mg into the layer 29 containing an organic resin as a main component followed by soaking in hot water at 50° C. or higher or exposure to water vapor. At this time, the uneven profile 31 is formed on the surface of the above metal due to hydration, dissolution, and redeposition. The plate crystal layer 30 can also be obtained by forming a layer containing aluminum oxide as a main component on the layer 29 containing an organic resin as a main component, and dissolving or depositing the surface selectively. The above layer containing aluminum oxide as a main component can be formed by a known vapor phase method such as CVD or PVD, a liquid phase method such as a sol-gel process, hydrothermal synthesis using an inorganic salt, or the like. According to the method of providing a plate crystal of aluminum oxide, an amorphous aluminum oxide layer may remain in a lower portion of the uneven profile 31 in the plate crystal layer 30.

It is preferred to use a method of treating a gel film with hot water, the gel film being formed by coating a sol-gel coating solution containing aluminum oxide to grow an alumina plate crystal, because a uniform antireflection layer can be formed on a substrate with a large area or on a non-planar substrate.

For a raw material of the gel film obtained from a sol-gel coating solution containing aluminum oxide, an Al compound is used, or at least one of compounds of Zr, Si, Ti, Zn and Mg is used together with the Al compound. As raw materials of $Al_2O_3$, $ZrO_2$, $SiO_2$, $TiO_2$, ZnO and MgO, metal alkoxides of the respective metals and salt compounds such as chlorides and nitrates of the respective metals may be used. Metal alkoxides are preferably used in terms of film formability particularly for $ZrO_2$, $SiO_2$ and $TiO_2$ raw materials.

Aluminum compounds include, for example, aluminum ethoxide, aluminum isopropoxide, aluminum-n-butoxide, aluminum-sec-butoxide, aluminum-tert-butoxide, aluminum acetylacetnate or oligomers of these compounds, aluminum nitrate, aluminum chloride, aluminum acetate, aluminum phosphate, aluminum sulfate, and aluminum hydroxide.

Specific examples of zirconium alkoxides include zirconium tetramethoxide, zirconium tetraethoxide, zirconium tetra n-propoxide, zirconium tetraisopropoxide, zirconium tetra n-butoxide, and zirconium tetra-t-butoxide.

For the silicon alkoxide, various kinds of compounds expressed by the general formula $Si(OR)_4$ may be used. R is the same or different lower alkyl group such as a methyl group, an ethyl group, a propyl group, an isopropyl group, a butyl group, or an isobutyl group.

Titanium alkoxides include, for example, tetramethoxy titanate, tetraethoxy titanate, tetra n-propoxy titanate, tetraisopropoxy titanate, tetra n-butoxy titanate, and tetraisobutoxy titanate.

Zinc compounds include, for example, zinc acetate, zinc chloride, zinc nitrate, zinc stearate, zinc oleate, and zinc salicylate, and especially preferred are zinc acetate and zinc chloride.

Magnesium compounds include magnesium alkoxides such as magnesium dimethoxide, magnesium diethoxide, magnesium dipropoxide and magnesium dibutoxide, magnesium acetylacetate, and magnesium chloride.

Organic solvents, which may be any organic solvents which do not cause raw materials such as the above-mentioned alkoxides to gelate, include: for example, alcohols such as methanol, ethanol, 2-propanol, butanol, ethylene glycol, and ethylene glycol-mono-n-propyl ether; various kinds of aliphatic or alicyclic hydrocarbons such as n-hexane, n-octane, cyclohexane, cyclopentane, and cyclooctane; various kinds of aromatic hydrocarbons such as toluene, xylene, and ethyl benzene; various kinds of esters such as ethyl formate, ethyl acetate, n-butyl acetate, ethylene glycol monomethyl ether acetate, ethylene glycol monoethyl ether acetate, and ethylene glycol monobuthyl ether acetate; various kinds of ketones such as acetone, methyl ethyl ketone, methyl isobutyl ketone, and cyclohexanone; various kinds of ethers such as dimethoxy ethane, tetrahydrofuran, dioxane, and diisopropyl ether; various kinds of chlorinated hydrocarbons such as chloroform, methylene chloride, carbon tetrachloride, and tetrachloroethane; and aprotic polar solvents such as N-methyl pyrrolidone, dimethyl formamide, dimethyl acetamide, and ethylene carbonate. Of the various kinds of solvents described above, alcohols are preferably used in terms of stability of a solution.

If an alkoxide raw material is used, particularly alkoxides of aluminum, zirconium, and titanium are highly reactive to water, and are abruptly hydrolyzed by addition of moisture in air or water, resulting in opacity and precipitation. Aluminum salt compounds, zinc salt compounds and magnesium salt compounds are hard to be dissolved in an organic solvent alone, and the stability of their solutions is low. For prevention of such a situation, a stabilizer is preferably added to stabilize the solution.

Stabilizers may include, for example: β-diketone compounds such as acetyl acetone, dipyrobilemethane, trifluoroacetylacetone, hexafluoroacetylacetone, benzoylacetone, and dibenzoylmethane; β-ketoester compounds such as methyl acetoacetate, ethyl acetoacetate, allyl acetoacetate, benzyl acetoacetate, iso-propyl acetoacetate, tert-butyl acetoacetate, iso-butyl acetoacetate, 2-methoxyethyl acetoacetate, and 3-keto-n-methyl valeriate; and alkanol amines such as monoethanol amine, diethanol amine and triethanol amine. The amount of stabilizer added is preferably about 1 in terms of molar ratio to the alkoxide or salt compound. After the stabilizer is added, a catalyst is preferably added for the purpose of promoting part of the reaction in order to form an appropriate precursor. Catalysts may include, for example, nitric acid, hydrochloric acid, sulfuric acid, phosphoric acid, acetic acid, and ammonia. As a method for forming a film using the above-described sol-gel coating solution, for example, a known coating method such as a dipping method, a spin coating method, a spray method, a printing method, a flow coating method, and a combination thereof may be appropriately employed.

After being coated with the above sol-gel coating solution, it is preferable to conduct heat-treatment in a range of 120° C. or more and 230° C. or less. As the temperature of heat treatment is higher, the film is likely to become more dense. However, when the temperature of the heat treatment exceeds 230° C., the damage such as deformation is caused in the substrate. The temperature of the heat treatment is more preferably 150° C. or more and 210° C. or less. The heating time is preferably 10 minutes or longer, although depending upon the heating temperature.

Then, a gel film which had undergone drying or heat treatment is immersed in hot water, whereby plate crystals containing aluminum oxide as a main component is precipitated to form an unevenness profile of the outermost surface. By immersion in hot water, the surface layer of the gel film containing aluminum oxide undergoes a deflocculating action or the like, and some components are eluted, but due to a difference in solubility in hot water between various kinds of hydroxides, plate crystals containing aluminum oxide as a main component are precipitated on the surface layer of the gel film, and grow. The temperature of hot water is preferably 40° C. to 100° C. The hot water treatment time is about 5 minutes to about 24 hours.

For the hot water treatment of a gel film with oxides such as $TiO_2$, $ZrO_2$, $SiO_2$, ZnO and MgO added as different kinds of components to the film containing aluminum oxide as a main component, crystallization is carried out using a difference in solubility in hot water between the components, and therefore unlike the hot water treatment of the single component film of aluminum oxide, the size of plate crystals can be controlled over a wide range by changing the composition of inorganic components. As a result, the unevenness profile formed by plate crystals can be controlled over the wide range. Moreover, if ZnO is used as a subcomponent, coprecipitation with aluminum oxide is possible, and therefore the refractive index can be controlled over a further wide range. Therefore, an excellent antireflection property is realized.

The organic resin used in the layer 29 containing an organic resin as a main component of the present invention may have a function of adjusting the refractive index difference between the substrate 28 and the plate crystal layer 30 containing aluminum oxide as a main component, and may be transparent in a wavelength region of light to be used.

The layer 29 containing an organic resin as a main component of the present invention adjusts the refractive index difference between the substrate 28 and the plate crystal layer 30 containing aluminum oxide as a main component, thereby contributing to the exhibition of high antireflection property. Therefore, it is desired that the layer 29 have an optimum film thickness and refractive index, and the optimum film thickness and refractive index are kept stably from the time when the film is produced. In the application of the present invention, a layer containing 80% by weight or more of an organic resin may be referred to as a layer containing an organic resin as a main component.

It is preferred that an organic resin having an aromatic ring and/or an imide ring in a main chain be used in the layer containing an organic resin as a main component of the present invention. An example of the aromatic ring or imide ring includes structures represented by the following chemical formulae.

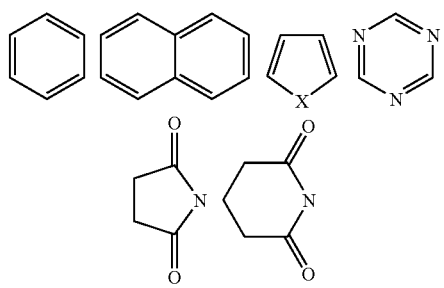

$X = CH_2, N, S$

Because an aromatic ring or an imide ring has a planar structure, molecular chains of an organic resin in which these structures are introduced in a main chain are likely to be aligned parallel to the substrate during the formation of a film. Therefore, even in the case where the organic resin layer 29 of the present invention having a film thickness of several 100 nm or less is used, the uniformity of film thickness and refractive index is high. Further, in that case, solvent resistance is excellent, a glass transition temperature is high, heat resistance is excellent, and film thickness and refractive index are unlikely to change.

When an organic resin having no aromatic ring and/or no imide ring in a main chain is used, molecular chains get entangled with each other randomly, so a decrease in refractive index probably caused by a decrease in density is observed when the resin is formed into a thin film. This also applies to the case where the plate crystal layer 30 formed of plate crystal containing aluminum oxide as a main component is produced from a sol-gel coating solution containing aluminum oxide. That is, for the same reasons as those in the above, the dissolution in a solvent contained in a sol-gel coating solution, a change in film thickness and refractive index due to swelling, deformation during drying by heating, decomposition, and coloring are likely to occur.

Further, in order to obtain the plate crystal layer 30 formed of plate crystals containing aluminum oxide as a main component, a gel film containing the aluminum oxide is exposed to water vapor or is soaked in hot water. At this time, it is desired that the change in film thickness and refractive index of the organic resin layer be minimized. In view of foregoing, it is preferred to use the organic resin layer 29 in which dissolution and swelling are unlikely to occur with hot water, unlike the organic resin having an aromatic ring and/or imide ring in a main chain. Further, the density of the film in the plate crystal layer is low, so moisture or the like from outside passes through the metal oxide layer easily and reaches the surface of the substrate. At this time, the surface of the substrate is eroded with moisture or the like, and a substrate component is eluted to degrade the performance of the optical member. The layer 3 or 5 containing an organic resin as a main component of the present invention is desired to have an effect of blocking moisture and the like coming from outside via the plate crystal layer. In order to obtain such an effect, it is preferred to use an organic resin having a low percentage of water absorption. Such an organic resin has a percentage of water absorption of 0.05% or more and 2% or less. When the organic resin has a percentage of water absorption of 2% or less, the organic resin can block moisture coming from outside. The percentage of water absorption as used herein refers to the percentage of water absorption of a film left at 23° C. for 24 hours after the film is formed. On the other hand, in the case of an organic resin having a percentage of water absorption of less than 0.05%, the adherence to the substrate is decreased remarkably. Therefore, even if pre-treatment of the surface of the substrate is conducted, the organic resin is peeled off from the substrate during hot water treatment and the like.

Regarding the kind of the organic resin, any of a thermosetting resin and a thermoplastic resin can be used as long as it is an organic resin having an aromatic ring and/or an imide ring in a main chain. Examples of the thermosetting resin include cured products of a compound or an oligomer having one or more reactive or polymerizable substituents, such as an epoxy group, an oxetanyl group, an episulphide group, a methylol group, an isocyanate group, a thioisocynate group, a vinyl ether group, an acryloyl group, a methacryloyl group, and a maleimide group. Even if one compound or oligomer contains two or more kinds of reactive or polymerizable substituents, a cured resin obtained by mixing two or more kinds of compounds having different reactive or polymerizable substituents or oligomers, followed by curing can be used. Examples of the cured resin having an aromatic ring and/or an imide ring in a main chain include a cured product of bisphenol A epoxy, a cured product of m-phenylenediisocyanate, and cured products of a methylomelamine resin, a guanamine resin, and a maleimide resin.

In the case of using a cured resin, an initiator and a curing agent can be used together when the above compound is cured. The initiator is mostly selected from radical, cation, and anion initiators depending upon the reactivity of a substituent of the above compound. Further, in the case of heat curing, a thermal decomposition type initiator is widely used. Examples of the thermal decomposition type initiator include N,N-azobisbutyronitrile as a radical initiator, and pyridinium p-toluenesulfonate as a cation initiator. Further, in the case of heat curing, an organic acid such as p-toluenesulfonic acid as a cation initiator and an organic amine such as diazabicycloundecene as an anion initiator may be mixed in small amounts. In the case of conducting curing with light such as UV-light, a photosensitive initiator is used.

On the other hand, examples of the thermoplastic resin having an aromatic ring and/or an imide ring in a main chain include aromatic polyethers such as polyether ketone and polyether sulfone, aromatic polyesters such as polyethylene terephthalate, aromatic polycarbonate, aromatic polyurethane, aromatic polyurea, aromatic polyamide, and thermoplastic polyimide. Of those, the aromatic polyethers, aromatic polysulfides, polycarbonate, and thermoplastic polyimides are preferred in terms of heat resistance.

Further, the thermoplastic resin is more preferred since a refractive index and a film thickness do not change under baking conditions, and less uncured monomer remains.

Further, in order to enhance the adherence between the substrate 25 and the layer 29 containing an organic resin as a main component, it is preferred to use an organic resin containing siloxane structure $(—SiR_2—O—)_m$, where R is a methyl group or a phenyl group, and m is an integer of 1 to 6.

When the adherence between the substrate 25 and the layer 29 is enhanced, film peeing particularly under high temperature and high humidity, cracks and the like can be suppressed.

In the organic resin containing $(—SiR_2—O—)_m$, the repeating unit including $(—SiR_2—O—)_m$ is preferably 30 mol % or less based on the whole repeating units. When it is 30 mol % or more, heat resistance is decreased due to the decrease in glass transition temperature, and wettability with respect to a glass substrate is decreased.

By changing the structure of an organic resin, the refractive index of the layer 2 or 5 containing the organic resin as a main component can be changed. For example, by increasing the number of aromatic rings contained in the organic resin and the number of hetero rings contained therein, the refractive index is enhanced. On the other hand, by increasing an aliphatic chain, an alicyclic structure, the above siloxane structure and fluoroalkyl group, etc., transparency is enhanced, and the refractive index is decreased. Among the organic resins having an aromatic ring and/or an imide ring in a main chain, examples of the organic resins whose refractive indices are changed relatively easily depending on the structure include polyimide, aromatic polyethers, aromatic polysulfides, and aromatic polycarbonate. These polymers can introduce the above structure into a main chain or a side chain together with an aromatic ring and an imide ring via a monomer.

Polyimide is synthesized generally by polyaddition reaction and dehydration-condensation reaction between a dianhydride and a diamine. By introducing an aliphatic chain, an alicyclic structure, or a fluoroalkyl group into a diamine and/or a dianhydride, a transparent polyimide in a visible light region is obtained. In particular, by using dianhydride having an alicyclic structure, and introducing one or a plurality of various kinds of structures such as siloxane structure, an aliphatic chain, an alicyclic structure, and an aromatic ring into diamine, the refractive index can be changed arbitrarily from 1.5 to 1.7.

Examples of a dianhydride used for the synthesis of thermoplastic polyimide include: aromatic acid dianhydrides such as pyromellitic dianhydride, 3,3'-biphthalic anhydride, 3,4'-biphthalic anhydride, 3,3',4,4'-benzophenonetetracarboxylic dianhydride, 3,3',4,4'-diphenylsulfonetetracarboxylic dianhydride, 4,4'-(hexafluoroisopropylidene)diphthalic anhydride, and 4,4'-oxydiphthalic dianhydride; and aliphatic acid dianhydrides such as meso-butane-1,2,3,4-tetracarboxylic dianhydride, 1,2,3,4-cyclobutanecarboxylic dianhydride, 1,2,3,4-cyclopentanetetracarboxylic dianhydride, 1,2,4,5-cyclohexanetetracarboxylic dianhydride, bicyclo[2.2.2]octo-7-ene-2,3,5,6-tetracarboxylic dianhydride, bicyclo[2.2.2]octane-2,3,5,6-tetracarboxylic dianhydride, bicyclo[2.2.1]heptane-2,3,5,6-tetracarboxylic dianhydride, 5-(2,5-dioxotetrahydrofuryl)-3-methyl-3-cyclohexene-1,2-dicalboxylic anhydride, and 4-(2,5-dioxotetrahydrofuran-3-yl)-1,2,3,4-tetrahydronaphthalene-1,2-dicarboxylic anhydride. From the viewpoint of enhancing solubility, coating property, and transparency of polyimide, preferred are 3,3',4,4'-diphenylsulfonetetracarboxylic dianhydride, 4,4'-(hexafluoroisopropylidene)diphthalic anhydride, 1,2,3,4-cyclobutanecarboxylic dianhydride, bicyclo[2.2.2]octane-2,3,5,6-tetracarboxylic dianhydride, bicyclo[2.2.1]heptane-2,3,5,6-tetracarboxylic dianhydride, 5-(2,5-dioxotetrahydrofuryl)-3-methyl-3-cyclohexene-1,2-dicalboxylic anhydride, and 4-(2,5-dioxotetrahydrofuran-3-yl)-1,2,3,4-tetrahydronaphthalene-1,2-dicarboxylic anhydride.

Examples of the diamine used for the synthesis of thermoplastic polyimide include: aromatic diamines such as m-phenylenediamine, p-phenylenediamine, 3,4'-diaminodiphenylmethane, 4,4'-diaminodiphenylmethane, 4,4'-diamino-3,3'-dimethyldiphenylmethane, o-tolidine, m-tolidine, 4,4'-diaminobenzophenone, 1,1-bis(4-aminophenyl)cyclohexane, 3,4'-diaminodiphenyl ether, 4,4'-diaminodiphenyl ether, 1,4-bis(4-aminophenoxy)benzene, 1,3-bis(4-aminophenoxy)benzene, 2,2-bis[4-(4-aminophenoxy)phenyl]propane, 4,4'-bis(4-aminophenoxy)biphenyl, bis[4-(4-aminophenoxy)phenyl]sulfone, 4,4'-bis(3-aminophenoxy)biphenyl, bis[4-(4-aminophenoxy)phenyl]sulfone, 9,9-bis(4-aminophenyl)fluorene, 2,2-bis(4-aminophenyl)hexafluoropropane, 2,2-bis[4-(4-aminophenoxy)phenyl]hexafluoropropane, and 2,2'-bis(trifluoromethyl)benzidine; aliphatic diamines such as 1,4-diaminobutane, 1,5-diaminopentane, 1,3-cyclohexanediamine, 1,4-cyclohexanediamine, 4,4'-methylenebis(cyclohexylamine), 4,4'-methylenebis(2-methylcyclohexylamine), and 1,4-bis(aminomethyl)cyclohexane; and —SiR$_2$—O— group-containing diamines such as 1,3-bis(3-aminopropyl)tetramethyldisiloxane and 1,4-bis(3-aminopropyldimethylsilyl)benzene. From the viewpoint of adherence with an inorganic substrate such as glass, it is preferred to include at least —SiR$_2$—O— group-containing diamines such as 1,3-bis(3-aminopropyl)tetramethyldisiloxane and 1,4-bis(3-aminopropyldimethylsilyl)benzene.

The aromatic polyethers are synthesized generally by subjecting a bisphenol and an aromatic dihalide to condensation reaction in a solvent in the presence of a base such as potassium carbonate. When bisphenol is replaced by aromatic disulfide, aromatic polysulfide is synthesized. By introducing one or a plurality of various kinds of structures into bisphenol or aromatic disulfide and aromatic dihalide, the refractive index can be changed arbitrarily from 1.5 to 1.7.

Examples of the bisphenol used for the synthesis of aromatic polyether include resorcinol, hydroquinone, 4,4'-biphenol, 2,2-bis(4-hydroxyphenyl)propane, 4,4'-dihydroxydiphenylmethane, 1,1-bis(4-hydroxyphenyl)cyclohexane, 1,1-bis(4-hydroxy-3-methylphenyl)cyclohexane, 4,4'-(1-α-methylbenzylidene)bisphenol, 1,3-bis[2-(4-hydroxyphenyl)-2-propyl]benzene, α,α'-bis(4-hydroxyphenyl)-1,4-diisopropylbenzene, α,α'-bis(4-hydroxy-3,5-dimethylphenyl)-1,4-diisopropylbenzene, 9,9-bis(4-hydroxyphenyl)fluorene, 9,9-bis(4-hydroxy-3-methylphenyl)fluorene, 4,4'-dihydroxybenzophenone, bis(4-hydroxyphenyl)sulfone, bis(4-hydroxy-3,5-dimethylphenyl)sulfone, octafluoro-4,4'-biphenol, bis(4-fluorophenyl)sulfone, and 2,2-bis(4-hydroxyphenyl)hexafluoropropane.

Examples of the aromatic disulfide used for the synthesis of aromatic polysulfide include p-benzenedithiol, m-benzenedithiol, 4,4'-oxybisbenzenethiol, 4,4'-thiobisbenzenethiol, and 4,4'-biphenyldithiol.

Examples of the aromatic dihalide used for the synthesis of aromatic polyether or aromatic polysulfide include 4,4'-dichlorobenzophenone, 4,4'-difluorobenzophenone, 4,4'-dichlorophenyl sulfone, bis(4-fluorophenyl)sulfone, bis(4-fluoro-3-nitrophenyl)sulfone, 2,6-dichlorobenzonitrile, 2,6-difluorobenzonitrile, 2,4-difluorobenzonitrile, tetrafluoroisophthalonitrile, perfluorobiphenyl, and 3,5-dichloro-1-methoxytriazine. Further, instead of dihalide, dinitro compounds such as 2,4-dinitrobenzonitrile and 2,6-dinitrobenzonitrile may be used.

The aromatic polycarbonate is synthesized generally by a method of allowing bisphenol to react with phosgene in a solution, or a method of allowing bisphenol to react with a carbonate such as diphenyl carbonate in a melt state. By introducing one or a plurality of various kinds of structures into bisphenol, the refractive index can be changed arbitrarily from 1.5 to 1.65.

As bisphenol used for synthesizing aromatic polycarbonate, bisphenol used for synthesizing the above aromatic polyether is used.

In addition to the above bisphenol or aromatic disulfide, aliphatic diol and aliphatic disulfide can be used together with aromatic polyether, aromatic polysulfide, and aromatic polycarbonate.

Further, it is more preferred that a compound having one or more o-hydroxyphenoxypropylsiloxy groups be substituted for a part of bisphenol or aromatic disulfide. According to this method, a (—SiR$_2$—O—)$_n$ group can be introduced into a resin, whereby the adherence with respect to a substrate is enhanced.

It is preferred that the refractive index ni of the layer 29 containing an organic resin as a main component of the present invention satisfy nb≧ni≧ns with respect to the refractive index nb of the substrate 25 and the refractive index ns of the plate crystal layer 30 formed of plate crystal containing the aluminum oxide as a main component. It is preferred to select an organic resin or a structure in the organic resin as such. By adjusting ni in this range, a high antireflection property can be exhibited.

Further, the layer 29 containing an organic resin as a main component can contain a silane coupling agent in addition to the organic resin so that adherence can be enhanced. Further, in order to adjust the refractive index and decrease the percentage of water absorption, inorganic fine particles such as SiO$_2$, TiO$_2$, ZrO$_2$, SiO$_2$, ZnO, MgO, and Al$_2$O$_3$ can be mixed in a small amount. The amount of components other than the organic resin, which can be mixed, is less than 20 parts by weight based on 100 parts by weight of the entire organic resin layer, and when the components are mixed in an amount exceeding 20 parts by weight, there is a possibility that transparency and uniformity of a film thickness may be impaired.

It is easy to apply the organic resin to a substrate as a solution, which is preferred because this method is suitable for forming a thin film. In the case of a cured resin, a reactive or polymerizable compound or oligomer can be used by dissolving them in an organic solvent together with an initiator and a curing agent. On the other hand, a thermoplastic resin can be used by dissolving it in an organic solvent alone or together with a component other than an organic resin. In the case where the thermoplastic resin itself is insoluble or difficult to be solved in an organic solvent, a thermoplastic resin precursor can be used by dissolving it in an organic solvent. In the case of the latter, the process of converting the precursor into a thermoplastic resin is required.

Examples of an organic solvent used for forming the layer 29 containing an organic resin as a main component of the present invention include: ketones such as 2-butanone, methylisobutyl ketone, cyclopentanone, and cyclohexanone; esters such as ethyl acetate, n-butyl acetate, ethyleneglycol monomethylether acetate, propyleneglycol monomethylether acetate, and ethyl lactate; ethers such as tetrahydrofuran, dioxane, and diisopropyl ether; various aromatic hydrocarbons such as toluene, xylene, and ethylbenzene; chlorinated hydrocarbons such as chloroform, methylene chloride, and tetrachloroethane; and solvents such as N-methylpyrrolidone, N,N-dimethylformamide, N,N-dimethylacetamide, dimethyl sulfoxide, and sulfolane. Further, alcohols such as 1-butanol, methyl cellosolve, diglime, and methoxypropanol may also be used.

As the method of forming the layer 29 containing an organic resin as a main component using a solution of an organic resin, known coating means can be appropriately used, such as dipping, spin coating, spraying, printing, flow coating, and a combination thereof.

After coating of an organic resin solution, it is preferred to heat the solution at 60° C. to 240° C. for 5 minutes to 2 hours so as to remove the solvent. In the case of a resin curable with heat, the removal of the solvent and the curing of the resin can be performed simultaneously by this heat treatment. On the other hand, in the case of a resin curable with another means other than heat, it is necessary to appropriately select the irradiation of light such as UV-light, a laser, an electron beam, an X-ray, and a microwave, a radiation or an electromagnetic wave. Even in the case of curing a resin with another means other than heat, the reaction can be promoted by conducting further heat treatment.

The thickness of the layer 29 of the present invention containing an organic resin as a main component is 10 nm or more and 150 nm or less, more preferably 20 nm or more and 100 nm or less. If the thickness is less than the range, it is difficult to form a uniform coating, and desirable optical characteristics cannot be obtained. If the thickness is greater than the range, contribution to the reflection reducing effect is reduced due to interference and the like.

Substrates to be used in the present invention include glass, resins, glass mirrors and mirrors formed of resin. Typical examples of resin substrate include films and molded products of thermoplastic resins, such as polyester, triacetyl cellulose, cellulose acetate, polyethylene terephthalate, polypropylene, polystyrene, polycarbonate, polysulfone, polyacrylate, polymethacrylate, an ABS resin, polyphenylene oxide, polyurethane, polyethylene, polycycloolefin, and polyvinyl chloride; cross-linked films and cross-linked molded products obtained from various kinds of thermosetting resins, such as an unsaturated polyester resin, a phenol resin, a cross-linked polyurethane, a cross-linked acryl resin, and a cross-linked saturated polyester resin. Specific examples of glass may include no alkali glass and alumina silicate glass. Substrates for use in the present invention, which may be formed of any materials capable of being finally formed into a shape according to a use purpose, include flat plates, films, and sheets, and may have a two-dimensional or three-dimensional curved surface. The thickness can be appropriately determined, and is generally 5 nm or less, but is not limited thereto.

The optical transparent element of the present invention may be further provided with a layer for imparting various kinds of functions, in addition to the layers described above. For example, a hard coat layer may be provided on the layer of plate crystals for improving the hardness of the film, or a water-repellent layer of fluoroalkyl silane or alkyl silane may be provided for imparting water repellency. For the purpose of preventing deposition of contaminants, or the like, a layer of a material having a refractive index lower than that of plate crystals containing aluminum oxide as a main component, or a layer formed of an amphipathic compound may be provided. For improving the adherence between the substrate and the layer containing an organic resin as a main component, an adhesive layer or a primer layer may be used.

EXAMPLES

Hereinafter, the present invention will be described specifically with examples. However, the present invention is not limited to the examples. Optical films obtained in examples and comparative examples and having fine unevenness on the surface were evaluated by the methods described below.

Synthesis of Polyimides 1 to 5

Diamine (1), diamine (2), and diamine (3) in an amount of 0.012 mol in total were dissolved in N,N-dimethylacetamide (hereinafter, abbreviated as DMAc). While the diamine solution was cooled with water, 0.12 mol of acid dianhydride was added thereto. The amount of DMAc was set so that the total mass of diamine and acid dianhydride became 20% by weight. The solution was stirred at room temperature for 15 hours, whereby a polymerization reaction was performed. After the solution was diluted with DMAc so as to be 8% by weight, and 7.4 ml of pyridine and 3.8 ml of acetic anhydride were added to the resultant solution, followed by stirring at room temperature for 1 hour. Further, the solution was stirred for 5 hours while it was heated to 50° C. in an oil bath. The polymerized solution was re-precipitated in methanol to extract a polymer, and thereafter, washed in methanol several times. After the solution was dried in vacuum at 100° C., a light yellow powdery polyimide was obtained. The remaining amount of a carboxyl group was measured from a $^1$H-NMR spectrum to obtain the imidization rate. Table 1 shows compositions of polyimides 1 to 5.

TABLE 1

|  | Anhydride | Diamine (1) | Diamine (2) | Diamine (3) | Imidization rate (%) |
| --- | --- | --- | --- | --- | --- |
| Polyimide 1 | TDA-100 | BAPB (0.9) | BAPS (0.1) | — | 98 |
| Polyimide 2 | TDA-100 | BAPP (0.9) | LS-7430 (0.1) | — | 98 |
| Polyimide 3 | TDA-100 | m-TB (0.9) | DADCM (0.4) | LS-7430 (0.1) | 96 |

TABLE 1-continued

|  | Anhydride | Diamine (1) | Diamine (2) | Diamine (3) | Imidization rate (%) |
|---|---|---|---|---|---|
| Polyimide 4 | TDA-100 | DADCM (0.9) | LS-7430 (0.1) | — | 95 |
| Polyimide 5 | 6FDA | DADCM (0.9) | LS-7430 (0.1) | — | 98 |

TDA-100: 4-(2,5-dioxotetrahydrofuran-3-yl)-1,2,3,4-tetrahydronaphthalene-1,2-dicarboxylic anhydride
6FDA: 4,4'-(hexafluoroisopropylidene)diphtalic dianhydride
BAPB: 4,4'-bis(4-aminophenoxy)biphenyl
BAPP: 2,2-bis[4-(4-aminophenoxy)phenyl]propane
DADCM: 4,4'-diaminodicyclohexylmethane
LS-7430: 1,3-bis(3-aminopropyl)tetramethyldisiloxane (2) Synthesis of Polyether Ether Ketone 6

2.18 g of 4,4'-difluorobenzophenone, 3.79 g of 9,9-bis(4-hydroxy-3-methylphenyl)fluorene, and 1.72 g of potassium carbonate were added to 15 ml of DMAc, and stirred at room temperature. Further, 7.5 ml of toluene was added to the mixture, and moisture in the system was azeotropically removed while being heated to 120° C. The temperature was raised to 150° C., whereby toluene was removed completely. Further, the temperature was raised to 165° C., and polymerization was performed for 8 hours. After the mixture was diluted with 15 ml of DMAc, the polymerized solution was poured to acidic methanol to obtain a white fibrous polymer. The polymer was washed repeatedly with methanol, followed by drying, whereby polyether ether ketone 6 was obtained with a yield of 95%.

(3) Preparation of Polyimide Solutions 6 to 10

2.5 g powder of polyimides 1 to 5 was dissolved in cyclohexanone to prepare polyimide solutions 6 to 10.

(4) Preparation of Polycarbonate Solution 11

2.5 g of bisphenol Z polycarbonate (Z-400 (Trade Name) manufactured by Mitsubishi Gas Chemical Company, Inc.) was dissolved in cyclohexanone to prepare polycarbonate solution 11.

(5) Preparation of Thermosetting Resin Solution 12

5 g of melamine resin (NIKALAC MX-750LM (Trade Name) manufactured by Nippon Carbide Industries Co., Inc.) and 0.025 g of p-toluene sulfonic acid were dissolved in 95 g of 1-methoxy-2-propanol to prepare thermosetting resin solution 12.

(6) Preparation of $SiO_2$—$TiO_2$ Sol Solution 13

A mixed solvent of 3.15 g of 0.01 M diluted hydrochloric acid [HClaq.] and 29.5 g of 1-butanol/2-propanol (hereinafter, abbreviated as IPA) at a ratio of 1/1 (wt.) was added slowly to 14.6 g of ethyl silicate, and stirred at room temperature. After stirring for 6 hours, the resultant mixture was diluted with 92.5 g of a mixed solvent of 1-butanol/IPA at a ratio of 1/1 (wt.) to obtain an A-solution. Then, 10.2 g of tetra n-butoxytitanate and 3.9 g of ethylacetacetate were successively dissolved in 25.5 g of the mixed solvent of 1-butanol/IPA at a ratio of 1/1(wt.). This solution was stirred at room temperature for 3 hours to obtain a B-solution. While the A-solution was being stirred, the B-solution was added thereto slowly, and the mixture was stirred for further 3 hours at room temperature, whereby a $SiO_2$—$TiO_2$ sol solution 13 with a Si/Ti molar ratio of 7/3 was prepared.

(7) Preparation of Aluminum Oxide (Alumina($Al_2O_3$)) Sol Solution 14

24.6 g of Al(O-sec-Bu)$_3$ was dissolved in 115.3 g of a mixed solvent of 1-butanol/2-propanol (hereinafter, abbreviated as IPA) at a ratio of 1/1 (wt.), and 6.51 g of 3-ethyl oxybutanoate was added to the mixture, followed by stirring at room temperature for about 1 hour. After that, 0.01 M diluted hydrochloric acid [HClaq.] was added to the solution, and stirred at room temperature for about 3 hours. Further, the solution was stirred in an oil bath at 120° C. for 6 hours, whereby an alumina ($Al_2O_3$) sol solution 13 was prepared.

(8) Preparation of Aluminum Oxide (Alumina($Al_2O_3$)) Sol Solution 15

17.2 g of Al(O-sec-Bu)$_3$ was dissolved in 122.3 g of a mixed solvent of 1-butanol/2-propanol (hereinafter, abbreviated as IPA) at a ratio of 1/1 (wt.), and 4.56 g of 3-ethyl oxybutanoate was added to the solution, followed by stirring at room temperature for about 1 hour. After that, 0.01 M diluted hydrochloric acid [HClaq.] was added to the solution, and stirred at room temperature for about 3 hours. Further, the solution was stirred in an oil bath at 120° C. for 6 hours, whereby an alumina ($Al_2O_3$) sol solution 14 was prepared.

(9) Preparation of a Silane Coupling Agent Solution 16

0.5 g of 3-aminopropylethoxysilane was dissolved in 99.5 g of ethanol, and 0.5 g of ion exchange water was further added to the resultant solution. The solution was stirred at room temperature overnight to obtain a silane coupling agent solution 15.

(10) Preparation of Polyether Ether Ketone Solution 17

2.5 g of powder of polyether ether ketone 6 was dissolved in 10 g of cyclohexanone to prepare a polyether ether ketone solution 17.

(11) Preparation of a Polysulfone Solution 18

2.5 g of pellet-shaped polysulfone (Mn of 16,000 or more, manufactured by Sigma-Aldrich Corp.) was dissolved in 10 g of γ-butyrolactone to prepare a polysulfone solution 18.

(12) Preparation of a Polystyrene Solution 19

2.5 g of powder of polystyrene (manufactured by Sigma-Aldrich Corp.) was dissolved in 10 g of cyclohexanone to prepare a polystyrene solution 19.

(13) Measurement of Percentage of Water Absorption of an Organic Resin

A coating film of various kinds of organic resins was formed on a silicon substrate and sintered at 200° C. for 60 minutes. After that, the water absorption amount of the film after being soaked in ion-exchanged water at 23° C. for 24 hours was measured with a thermogravimetric apparatus (TG/TDA, Thermo plus 2 manufactured by Rigaku Corporation) to obtain the water absorption ratio of the film.

(14) Washing of Substrate

Various kinds of glass substrates with a size of about φ 30 mm and a thickness of about 2 mm with both surfaces polished were subjected to ultrasonic washing with an alkali detergent and IPA, and dried in an oven.

(15) Observation of Shape of Coating

The surface of a surface layer of a coating was photographically observed (acceleration voltage; 10.0 kV, magnification; 30,000) using a scanning electron microscope (FE-SEM, S4500 manufactured by Hitachi Ltd.).

(16) Measurement of Transmittance

A transmittance was measured over a range of 350 nm to 850 nm using an automatic optical member measuring apparatus (V-570 manufactured by JASCO). A disc glass plate was used. The angle of incidence of light in measurements of transmittance was 0°.

(17) Measurement of Film Thickness and Refractive Index

Measurements were made over a range of wavelengths from 380 nm to 800 nm by a spectral ellipsometer (VASE manufactured by J. A. Woollam JAPAN Co., Inc.).

Example 1

An appropriate amount of the polyimide solution 6 was dropped onto one surface of the S-TIH53 ($n_{550nm}$=1.84) substrate washed by the above method, followed by spin coating at 3,000 rpm for 20 seconds. The substrate was pre-dried at 80° C. for 10 minutes, and thereafter, the other surface was similarly spin-coated with the polyimide solution 6. After that, the resultant substrate was sintered in a hot air circulation oven at 200° C. for 30 minutes, whereby a substrate with an organic resin layer having the polyimide 1 on both surfaces was produced. Table 2 shows the thickness, refractive index, and percentage of water absorption of the polyimide film 1.

An appropriate amount of an alumina sol solution 14 was dropped onto one surface of the substrate with the film of the polyimide 1, followed by spin coating at 4,000 rpm for 20 seconds and pre-drying at 80° C. for 10 minutes. The other surface was similarly spin coated with the alumina sol solution. After that, the resultant substrate was sintered in a hot air circulation oven at 200° C. for 30 minutes, whereby the substrate was covered with transparent amorphous $Al_2O_3$ films.

Next, the substrate was soaked in hot water at 80° C. for 30 minutes, and dried at 60° C. for 10 minutes.

Figure 4:
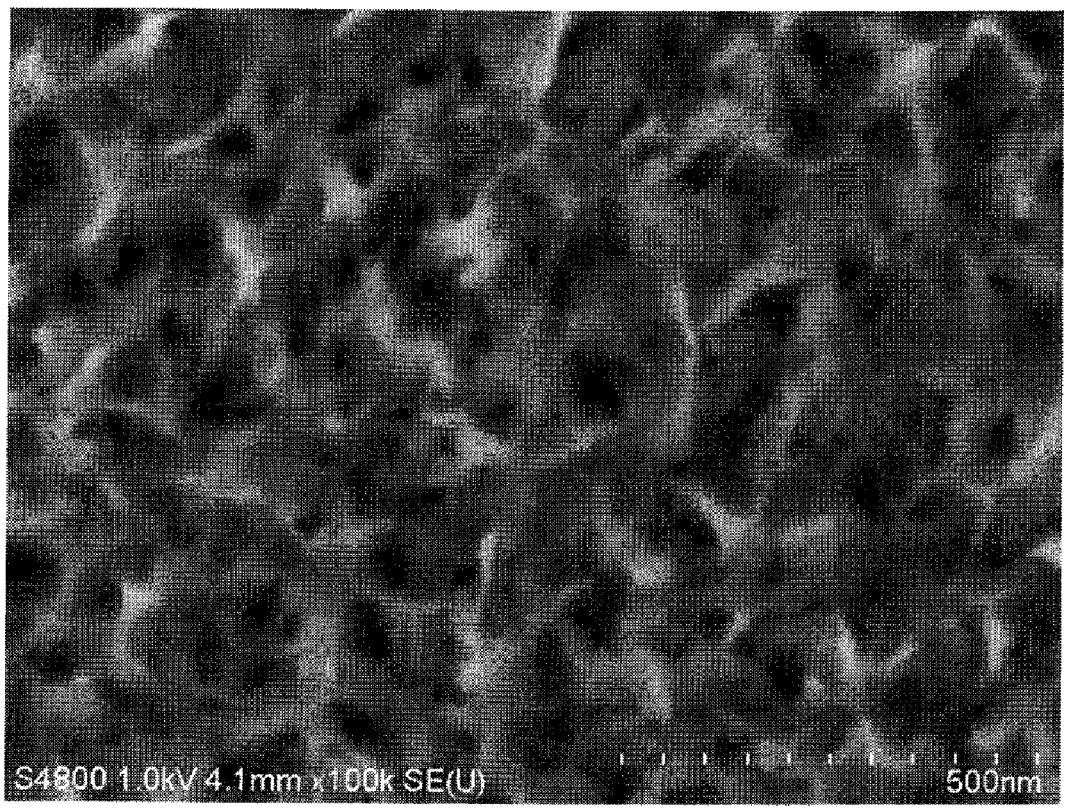
FIG. 4 is a photograph in Example 1 (magnification: ×100,000) illustrating a result of observation of a thin film formed on a glass substrate and having fine unevenness on the surface from the top surface by an FE-SEM.
Figure 5:
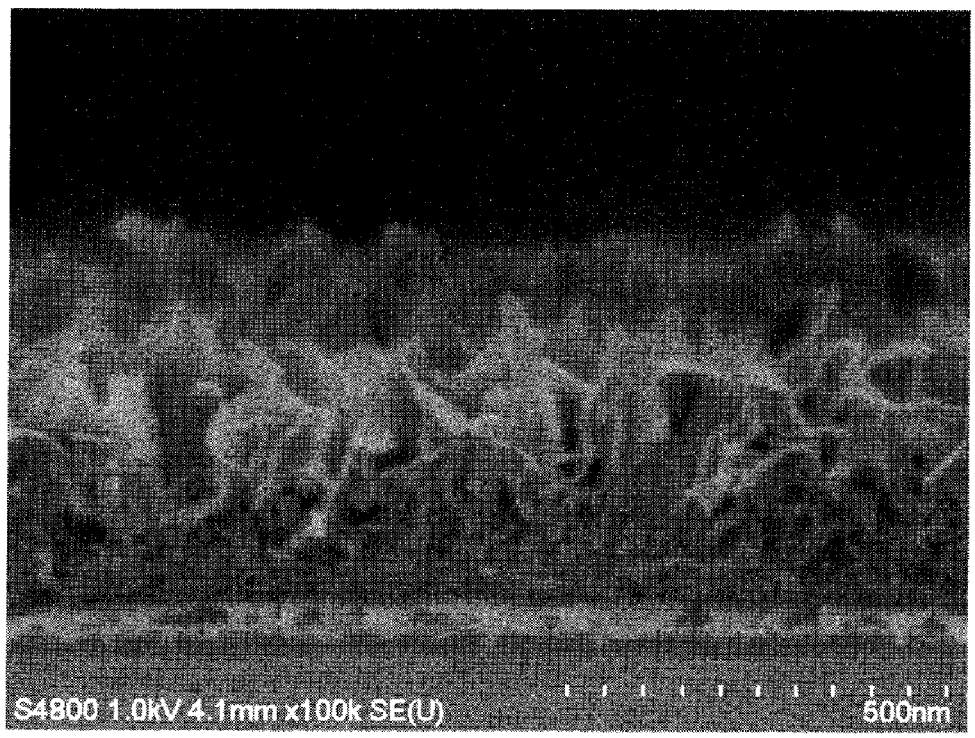
FIG. 5 is a photograph in Example 1 (magnification: ×150,000) illustrating a result of observation of the cross-section of a thin film formed on a glass substrate and having fine unevenness by an FE-SEM.

The surface of the obtained film was observed by the FE-SEM to find a fine uneven structure in which plate crystals containing $Al_2O_3$ as a main component were tangled randomly and complicatedly as shown in FIG. 4. By the observation of the cross-section by the FE-SEM, it was observed that a plate crystal layer containing $Al_2O_3$ as a main component was arranged selectively with an average angle of 75° with respect to the surface of the substrate.

Then, for the obtained film, the film thickness and the refractive index were measured using ellipsometry. The thickness and the refractive index of each film are shown in Table 3.

For this substrate, a high-temperature and high-humidity test at a temperature of 60° C. and a humidity of 90% was conducted as an accelerated test for examination on durability of optical performance, and the transmittance was measured at the start, after 250 hours and after 500 hours. The results thereof are shown in Table 3.

Example 2

The same operation as in Example 1 was conducted except for using the polyimide solution 7 in place of the polyimide solution 6 to form an organic resin layer formed of the polyimide 2.

Example 3

The same operation as in Example 2 was conducted except for replacing the substrate by S-LAH65 ($n_{550nm}$=1.80).

Example 4

The same operation as in Example 3 was conducted except for using the polyimide solution 8 in place of the polyimide solution 7 to form an organic resin layer formed of the polyimide 3.

Example 5

The same operation as in Example 3 was conducted except for using the polyimide solution 9 in place of the polyimide solution 7 to form an organic resin layer formed of the polyimide 4.

Example 6

An appropriate amount of the silane coupling agent solution 16 was dropped onto one surface of the washed S-LAH65 ($n_{550nm}$=1.80) substrate, followed by spin coating at 4,000 rpm for 20 seconds. The resultant substrate was dried at 80° C. for 10 minutes, and the other surface was similarly spin-coated with the silane coupling agent solution 16, followed by sintering at 80° C. for 10 minutes. An appropriate amount of the polycarbonate solution 11 was dropped onto one surface of the substrate, followed by spin coating at 3,000 rpm for 20 seconds. The resultant substrate was pre-dried at 80° C. for 10 minutes, and thereafter the other surface was similarly spin-coated with the polycarbonate solution 11. The resultant substrate was sintered in a hot air circulation oven at 200° C. for 60 minutes, whereby a substrate with an organic resin layer formed of bisphenol Z polycarbonate was produced. Table 2 shows the film thickness, refractive index, and percentage of water absorption of the thermosetting resin film.

Hereinafter, a transparent amorphous $Al_2O_3$ film was coated in the same way as in Example 1, and evaluated.

Example 7

The same operation as in Example 6 was conducted except for using the thermosetting resin solution 12 in place of the polycarbonate solution 11 to form an organic resin layer formed of a thermosetting resin.

Example 8

The same operation as in Example 4 was conducted except for replacing the substrate by S-LAH66 ($n_{550nm}$=1.77).

Example 9

The same operation as in Example 8 was conducted except for using the polyimide solution 9 in place of the polyimide solution 8 to form the organic resin layer formed of the polyimide 4.

Example 10

The same operation as in Example 6 was conducted except for replacing the substrate by S-LAH66 ($n_{550nm}$=1.77).

Example 11

The same operation as in Example 7 was conducted except for replacing the substrate by S-LAH66 ($n_{550nm}$=1.77).

Example 12

The same operation as in Example 1 was conducted except for replacing the substrate by S-TIH1 ($n_{550nm}$=1.71) and using the polyimide solution 10 in place of the polyimide solution 6 to form an organic resin layer formed of the polyimide 5.

Example 13

The same operation as in Example 6 was conducted except for replacing the substrate by S-TIH1 ($n_{550nm}$=1.71).

Example 14

An appropriate amount of the polyimide solution 7 was dropped onto one surface of the washed S-LAH65 ($n_{550nm}$=1.80) substrate, followed by spin coating at 3,000 rpm for 20 seconds. The substrate was pre-dried at 80° C. for 10 minutes, and thereafter, the other surface was similarly spin-coated with the polyimide solution 7. After that, the resultant substrate was sintered in a hot air circulation oven at 200° C. for 30 minutes, whereby a substrate with an organic resin layer having the polyimide 2 on both surfaces was produced.

An appropriate amount of an alumina sol solution 15 was dropped onto one surface of the substrate with the film of the polyimide 2, followed by spin coating at 2,700 rpm for 20 seconds and pre-drying at 80° C. for 10 minutes. The other surface was similarly spin coated with the alumina sol solution 15. After that, the resultant substrate was sintered in a hot air circulation oven at 200° C. for 10 minutes. Further, both surfaces were coated again with the alumina sol solution 15 by the same method, and the substrate was finally sintered at 200° C. for 30 minutes, whereby the substrate was covered with transparent amorphous $Al_2O_3$ films.

Next, the substrate was soaked in hot water at 80° C. for 30 minutes, and dried at 60° C. for 10 minutes.

Hereinafter, the same evaluation as that in Example 1 was conducted.

Example 15

The same operation as in Example 14 was conducted except for using the polycarbonate solution 11 in place of the polyimide solution 9 to form an organic resin layer formed of polycarbonate.

Example 16

The same operation as in Example 6 was conducted except for using the polyether ether ketone solution 17 in place of the polycarbonate solution 11 to form an organic resin layer formed of polyether ether ketone.

Example 17

The same operation as in Example 6 was conducted except for using the polysulfone solution 18 in place of the polycarbonate solution 11 to form an organic resin layer formed of polysulfone.

Comparative Example 1

An appropriate amount of the alumina sol solution 14 was dropped onto one surface of the washed S-TIH53 ($n_{550nm}$=1.84) substrate, followed by spin coating at 4,000 rpm for 20 seconds and pre-drying at 80° C. for 10 minutes. The other surface was similarly spin coated with the alumina sol solution. After that, the resultant substrate was sintered in a hot air circulation oven at 200° C. for 30 minutes, whereby the substrate was covered with transparent amorphous $Al_2O_3$ films.

Next, the substrate was soaked in hot water at 80° C. for 30 minutes, and dried at 60° C. for 10 minutes.

Hereinafter, the same evaluation as that in Example 1 was conducted.

Comparative Example 2

The same operation as that in Comparative Example 1 was conducted except for replacing the substrate by S-LAH65 ($n_{550nm}$=1.80).

Comparative Example 3

An appropriate amount of the $SiO_2$—$TiO_2$ sol solution 13 was dropped onto one surface of the washed S-TIH53 ($n_{550nm}$=1.84) substrate, followed by spin coating at 3,000 rpm for 20 seconds. After the substrate was pre-dried at 80° C. for 10 minutes, the other surface was similarly spin-coated with the $SiO_2$—$TiO_2$ sol solution 13. After that, the substrate was sintered in a hot air circulation oven at 200° C. for 60 minutes, whereby the substrate with amorphous $SiO_2$—$TiO_2$ films on both surfaces was produced. Table 2 shows the film thickness, refractive index, and percentage of water absorption of the amorphous $SiO_2$—$TiO_2$ film.

Hereinafter, an antireflection film was formed by the same method as that in Example 1 after covering the substrate with the amorphous $Al_2O_3$ films, and evaluation was conducted.

Comparative Example 4

The same operation as that in Comparative Example 3 was conducted except for replacing the substrate by S-LAH65 ($n_{550nm}$=1.80).

Comparative Example 5

The same operation as in Example 6 was conducted except for using the polystyrene solution 19 in place of the polycarbonate solution 11 to form an organic resin layer formed of polystyrene. However, when the substrate was soaked in hot water after being covered with the amorphous $Al_2O_3$ films, film peeling occurred from an organic intermediate layer, with the result that an antireflection film was not obtained.

TABLE 2

|  | Solution | Percentage of water absorption (%) |
|---|---|---|
| Polyimide 1 | Polyimide solution 6 | 1.2 |
| Polyimide 2 | Polyimide solution 7 | 1.3 |
| Polyimide 3 | Polyimide solution 8 | 0.8 |
| Polyimide 4 | Polyimide solution 9 | 1.8 |
| Polyimide 5 | Polyimide solution 10 | 0.6 |
| Bisphenol z polycarbonate | Polycarbonate solution 11 | 0.2 |
| Thermosetting resin | Thermosetting resin solution 12 | 0.8 |
| Polyether ether ketone | Polyether ether ketone solution 17 | 0.2 |
| Polysulfone | Polysulfone solution 18 | 0.3 |
| Polystyrene | Polystyrene solution 19 | 0.1 |

(Note)
Percentage of water absorption: after soaking in ion exchanged water at 23° C. for 24 hours

TABLE 3

| | Substrate | | Organic resin layer | | | Plate crystal layer containing Al₂O₃ as a main component | | Transmittance measurement result (550 nm) high-temperature and high-humidity test | | |
|---|---|---|---|---|---|---|---|---|---|---|
| | Kind | Refractive index | Kind | Film thickness | Refractive index | Film thickness | Refractive index | At start | 250 hours | 500 hours |
| Example 1 | S-TIH53 | 1.84 | Polyimide 1 | 78 | 1.66 | 250 | 1.42-1.0 | 99.3 | 99.2 | 99.2 |
| Example 2 | S-TIH53 | 1.84 | Polyimide 2 | 75 | 1.63 | 250 | 1.42-1.0 | 99.2 | 99.1 | 99.0 |
| Example 3 | S-LAH65 | 1.80 | Polyimide 2 | 75 | 1.63 | 250 | 1.42-1.0 | 99.2 | 99.2 | 99.2 |
| Example 4 | S-LAH65 | 1.80 | Polyimide 3 | 79 | 1.61 | 250 | 1.42-1.0 | 99.4 | 99.5 | 99.4 |
| Example 5 | S-LAH65 | 1.80 | Polyimide 4 | 78 | 1.57 | 250 | 1.43-1.0 | 99.4 | 99.3 | 99.2 |
| Example 6 | S-LAH65 | 1.80 | Polycarbonate | 80 | 1.59 | 250 | 1.43-1.0 | 99.3 | 99.3 | 99.2 |
| Example 7 | S-LAH65 | 1.80 | Thermosetting resin | 70 | 1.61 | 250 | 1.42-1.0 | 99.2 | 99.2 | 99.0 |
| Example 8 | S-LAH66 | 1.77 | Polyimide 3 | 79 | 1.61 | 250 | 1.42-1.0 | 99.4 | 99.5 | 99.4 |
| Example 9 | S-LAH66 | 1.77 | Polyimide 4 | 78 | 1.57 | 250 | 1.42-1.0 | 99.5 | 99.5 | 99.4 |
| Example 10 | S-LAH66 | 1.77 | Polycarbonate | 80 | 1.59 | 250 | 1.42-1.0 | 99.5 | 99.4 | 99.4 |
| Example 11 | S-LAH66 | 1.77 | Thermosetting resin | 70 | 1.61 | 250 | 1.42-1.0 | 99.4 | 99.3 | 99.1 |
| Example 12 | S-TIH1 | 1.71 | Polyimide 5 | 78 | 1.56 | 250 | 1.43-1.0 | 99.4 | 99.3 | 99.3 |
| Example 13 | S-TIH1 | 1.71 | Polycarbonate | 80 | 1.59 | 250 | 1.42-1.0 | 99.5 | 99.4 | 99.3 |
| Example 14 | S-LAH65 | 1.80 | Polyimide 2 | 75 | 1.63 | 200 | 1.42-1.0 | 99.2 | 99.1 | 99.1 |
| Example 15 | S-LAH65 | 1.80 | Polycarbonate | 80 | 1.59 | 200 | 1.42-1.0 | 99.2 | 99.2 | 99.1 |
| Example 16 | S-LAH65 | 1.80 | Polyether ether ketone | 75 | 1.62 | 250 | 1.42-1.0 | 99.5 | 99.4 | 99.3 |
| Example 14 | S-LAH65 | 1.80 | Polysulfone | 78 | 1.63 | 200 | 1.42-1.0 | 99.2 | 99.1 | 99.0 |
| Comparative Example 1 | S-TIH53 | 1.84 | — | — | — | 250 | 1.40-1.0 | 97.5 | 94.2 | 90.0 |
| Comparative Example 2 | S-LAH65 | 1.80 | — | — | — | 250 | 1.40-1.0 | 98.0 | 95.4 | 93.3 |
| Comparative Example 3 | S-TIH53 | 1.84 | SiO₂—TiO₂ | 85 | 1.61 | 250 | 1.40-1.0 | 99.2 | 98.2 | 94.2 |
| Comparative Example 4 | S-LAH65 | 1.80 | SiO2—TiO2 | 85 | 1.61 | 250 | 1.40-1.0 | 99.4 | 97.8 | 93.5 |
| Comparative Example 5 | S-LAH65 | 1.80 | Polystyrene | 70 | 1.59 | Peeling from intermediate layer during hot water treatment | | | | |

(Note)
The refractive index of the crystal layer of plate crystals shows values of a starting point and an ending point of an inclination refractive index part. For example, the refractive index 1.42-1.0 in Example 1 shows that the refractive index continuously decreases from 1.42 to 1.0.

Performance Evaluation

As a result of comparing the transmittance at 550 nm with respect to the produced optical films, optical members were obtained with which a high transmittance was kept even after an acceleration durability test in high temperature and high humidity in Examples 1 to 17. On the other hand, in Comparative Example 5, an antireflection film capable of being evaluated for the performance was not obtained due to film peeling. In Comparative Examples 1 and 2, the transmittance was low from the beginning, and the transmittance was decreased after the acceleration durability test in Comparative Examples 3 and 4.

Example 18

Figure 6:
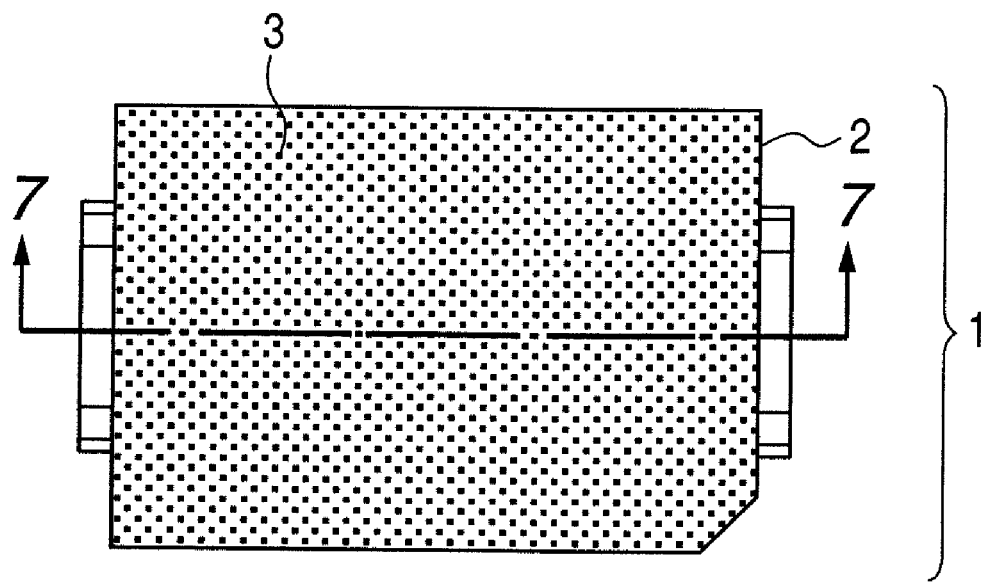
FIG. 6 is a front view of Example 16 of the present invention.

FIG. 6 is a front view of an optical member of Example 16. In this figure, an optical member 1 is a concave lens, and a substrate 2 is provided with an optical member 3.

Figure 7:
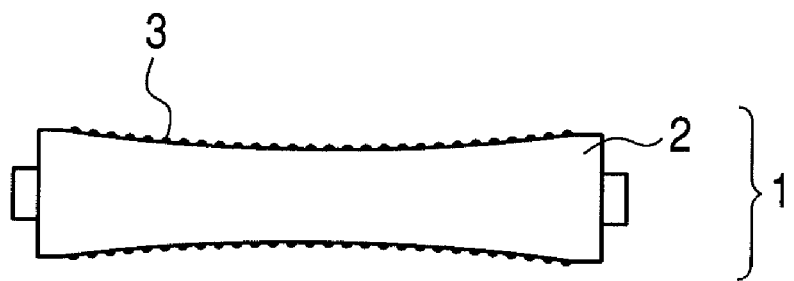
FIG. 7 is a cross-sectional view of Example 16 of the present invention.

FIG. 7 illustrates a cross-section of the optical member of Example 18 cut taken along the 7-7 section in FIG. 6. A layer containing an organic resin as a main component, and a layer having arranged plate crystals containing aluminum oxide as a main component are formed on an optical surface, and an optical member 3 having an uneven profile is formed on the outermost surface, whereby reflection of light at the optical surface is reduced.

In this example, the optical member is a concave lens, but the present invention is not limited thereto, and the lens may be either a convex lens or a meniscus lens.

Example 19

Figure 8:
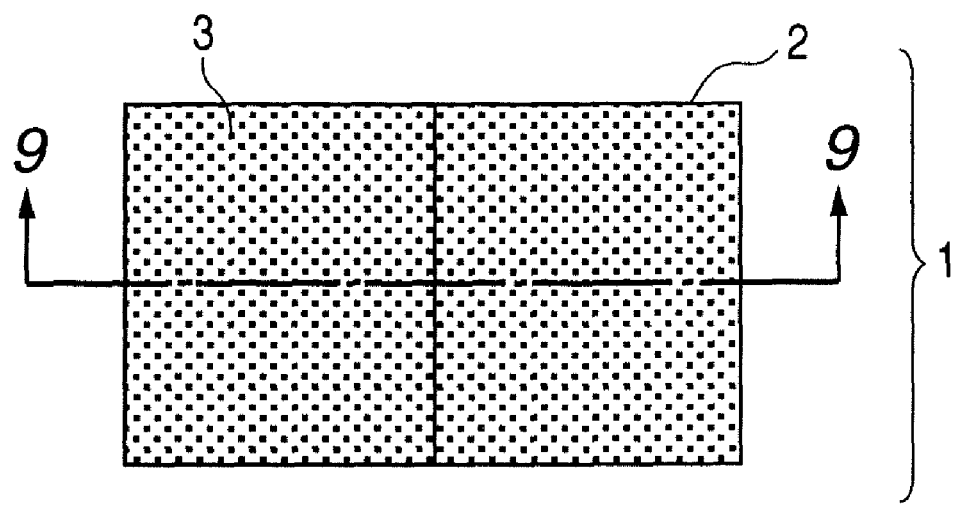
FIG. 8 is a front view of Example 17 of the present invention.

FIG. 8 is a front view of an optical member of Example 19. In this figure, an optical member 1 is a prism, and a base body 2 is provided with an optical member 3.

Figure 9:
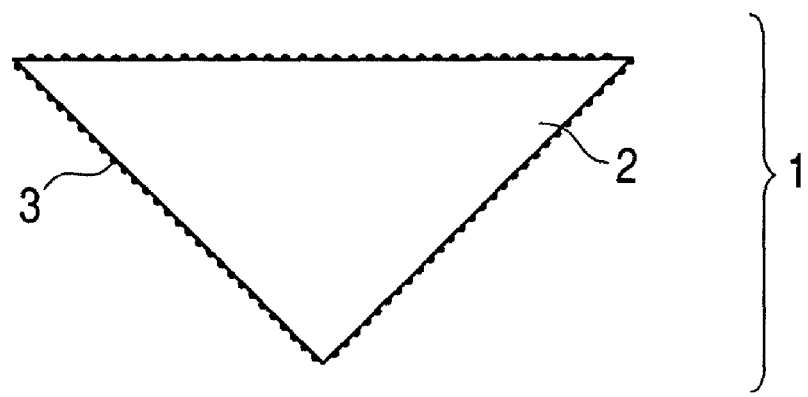
FIG. 9 is a cross-sectional view of Example 17, of the present invention.

FIG. 9 shows a cross-section of the optical member of Example 19 cut taken along the 9-9 section in FIG. 8. A layer containing an organic resin as a main component, and a layer having arranged plate crystals containing aluminum oxide as a main component are formed on an optical surface, and the optical member 3 having an uneven profile is formed on the outermost surface, whereby reflection of light at the optical surface is reduced.

In this example, angles formed by optical surfaces of the prism are 90° C. and 45° C., but the present invention is not limited thereto, and the optical surfaces of the prism may form any angle.

Example 20

Figure 10:
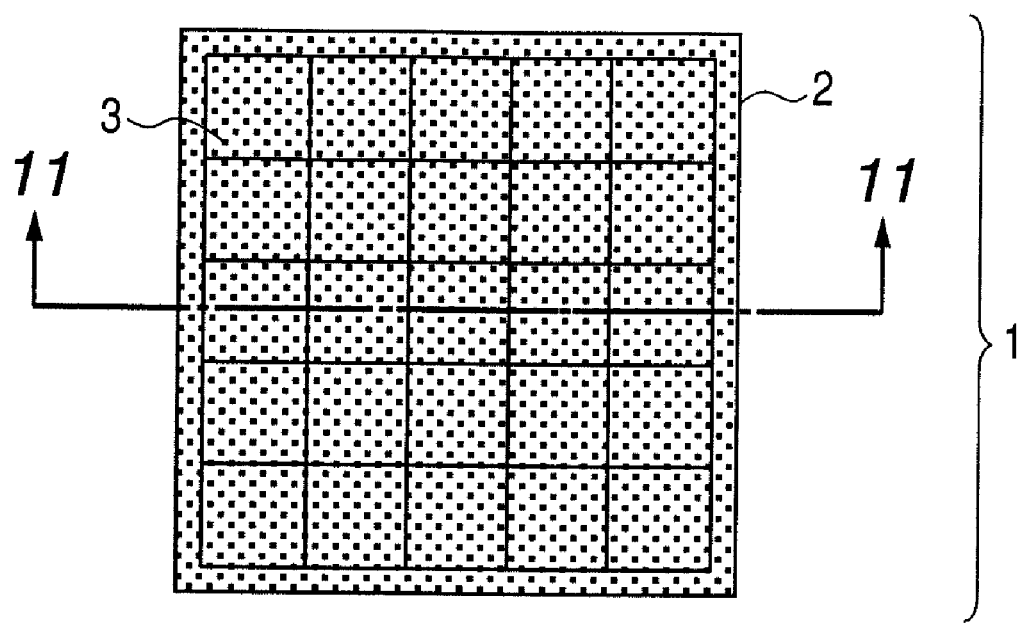
FIG. 10 is a front view of Example 18 of the present invention.

FIG. 10 is a front view of an optical member of Example 20 of the present invention. In this figure, an optical member 1 is a fly eye integrator, and a substrate 2 is provided with an optical member 3.

Figure 11:
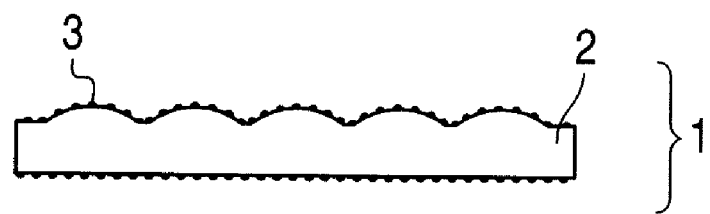
FIG. 11 is a cross-sectional view of Example 18 of the present invention.

FIG. 11 shows a cross-section of an optical member of Example 20 cut taken along the 11-11 section in FIG. 10. A layer containing an organic resin as a main component, and a layer having arranged plate crystals containing aluminum oxide as a main component are formed on an optical surface, and an optical member 3 having an uneven profile is formed on the outermost surface, whereby reflection of light at the optical surface is reduced.

Example 21

Figure 12:
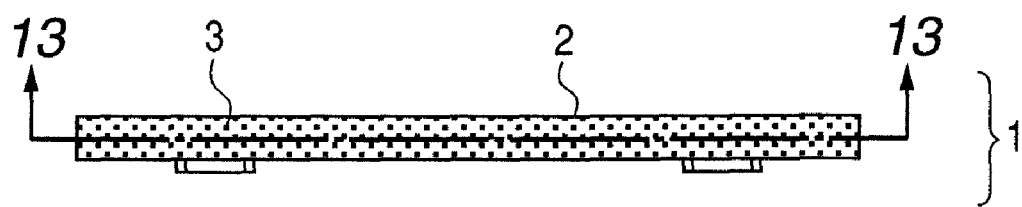
FIG. 12 is a front view of Example 19 of the present invention.

FIG. 12 is a front view of an optical member of Example 21 of the present invention. In this figure, an optical member 1 is an fθ lens, and a substrate 2 is provided with an optical member 3.

Figure 13:
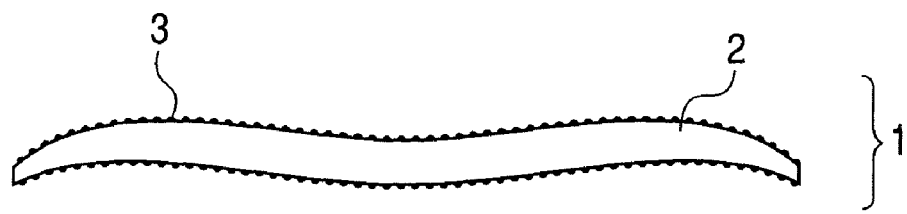
FIG. 13 is a cross-sectional view of Example 19 of the present invention.

FIG. 13 illustrates a cross-section of an optical member of Example 21 cut taken along the 13-13 section in FIG. 12. A layer containing an organic resin as a main component, and a layer having arranged plate crystals containing aluminum oxide as a main component are formed on an optical surface, an the optical member 3 having an uneven profile is formed on the outermost surface, whereby reflection of light at the optical surface is reduced.

Example 22

Figure 14:
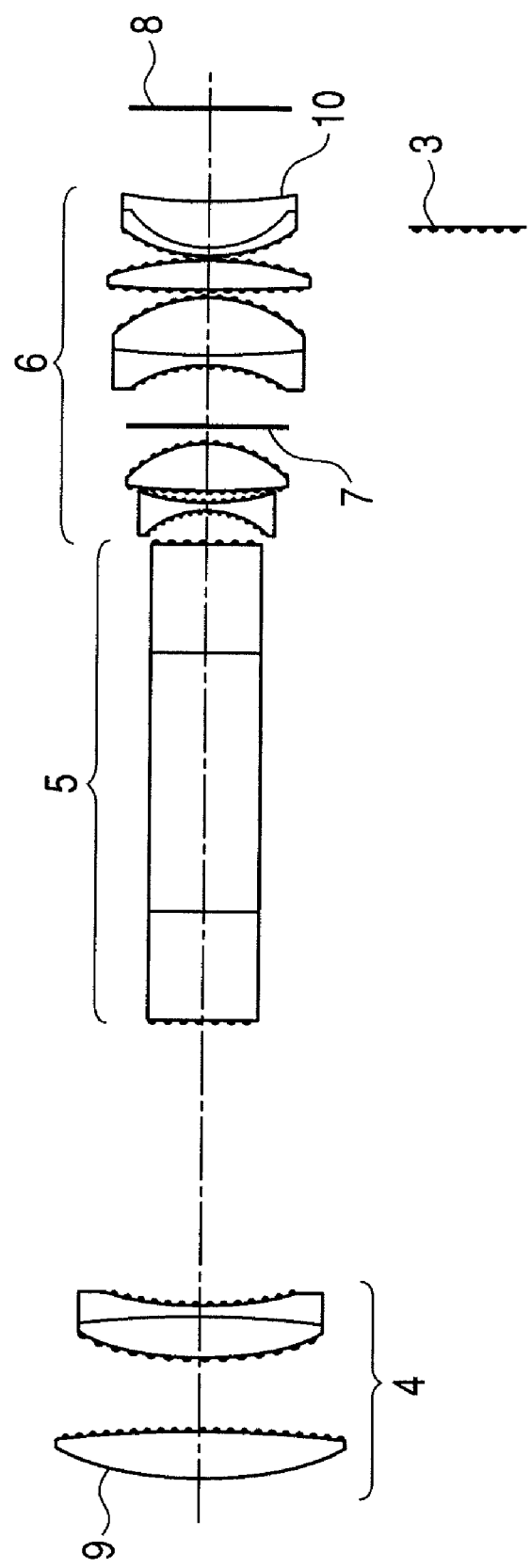
FIG. 14 is a front view of Example 20 of the present invention.

An example in which the optical member of the present invention is used in an observation optical system is shown as Example 22 of the present invention. FIG. 14 illustrates a cross-section of one of a pair of optical systems of a binocular.

In this figure, reference numeral 4 denotes an objective lens, reference numeral 5 denotes a prism (shown in an exposed form) for inverting an images reference numeral 6 denotes an eye lens, reference numeral 7 denotes an image formation surface, and reference numeral 8 denotes a pupil surface (evaluation surface). In the figure reference numeral 3 (shown with a legend) denotes an optical transparent element relating to the present invention. A layer containing an organic resin as a main component, and a layer having arranged plate crystals containing aluminum oxide as a main component are formed, and the outermost surface has an uneven profile, whereby reflection of light at each optical surface is reduced. In this example, the optical member 3 formed of a fine uneven configuration is provided neither on an optical surface 9 of the objective lens closest to an object nor on an optical surface 10 of the eye lens closest to the evaluation surface. The reason why the optical member 3 is not provided on these surfaces is that its performance will be degraded due to contact while it is used, but the present invention is not limited thereto, and the optical member 3 may be provided on the optical surfaces 9 and 10.

Example 23

Figure 15:
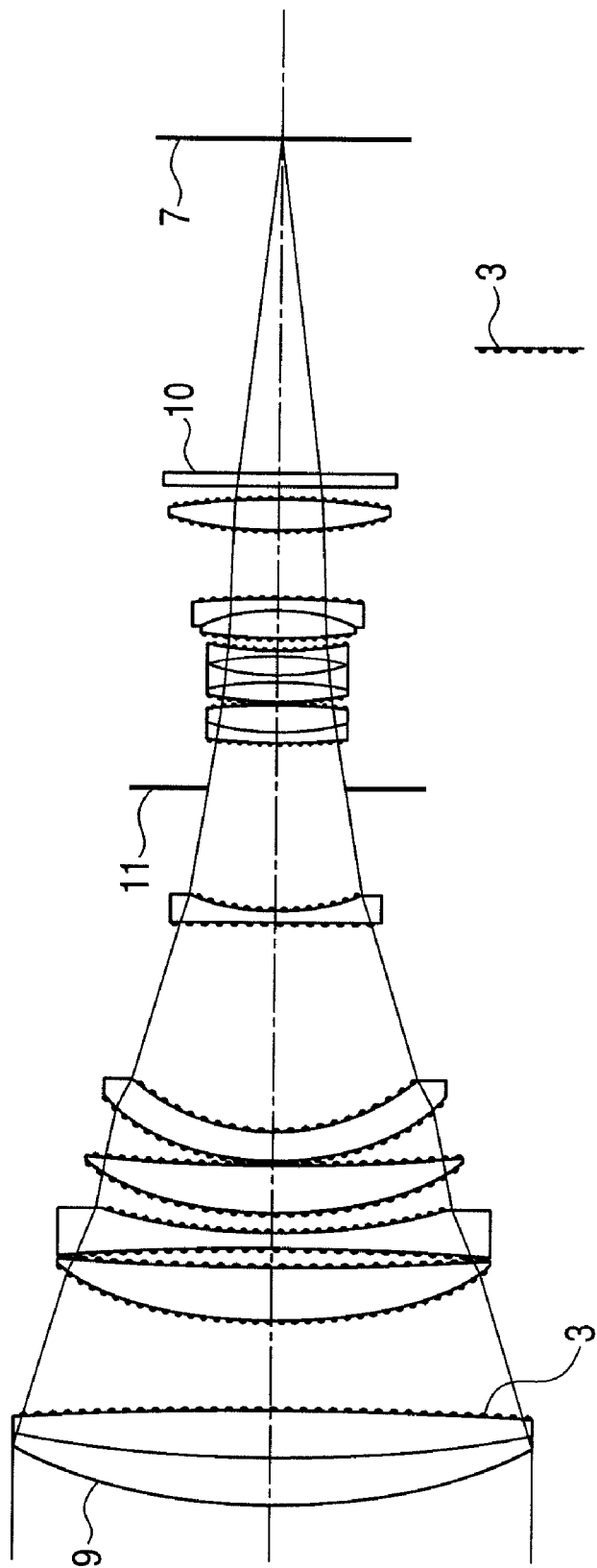
FIG. 15 is a cross-sectional view of Example 21 of the present invention.

An example in which the optical member of the present invention is used in an imaging optical system is shown as Example 23 of the present invention. FIG. 15 illustrates a cross-section of a photographing lens (telephoto lens is illustrated in this figure) of a camera or the like.

In this figure, reference numeral 7 denotes a film as an image formation surface, or a solid imaging device (photoelectric conversion element) such as a CCD or a CMOS, and reference numeral 11 denotes a diaphragm. In the figure, reference numeral 3 (shown with a legend) denotes an optical member relating to the present invention. A layer containing an organic resin as a main component, and a layer having arranged plate crystals containing aluminum oxide as a main component are formed, and the outermost surface has an uneven profile, whereby reflection of light at each optical surface is reduced. In this example, the optical member 3 formed of a fine uneven configuration is not provided on an optical surface 9 of the objective lens closest to an object. The reason why the optical member 3 is not provided on the surface is that its performance will be degraded due to contact while it is used, but the present invention is not limited thereto, and the optical member 3 may be provided on the optical surface 9.

Example 24

Figure 16:
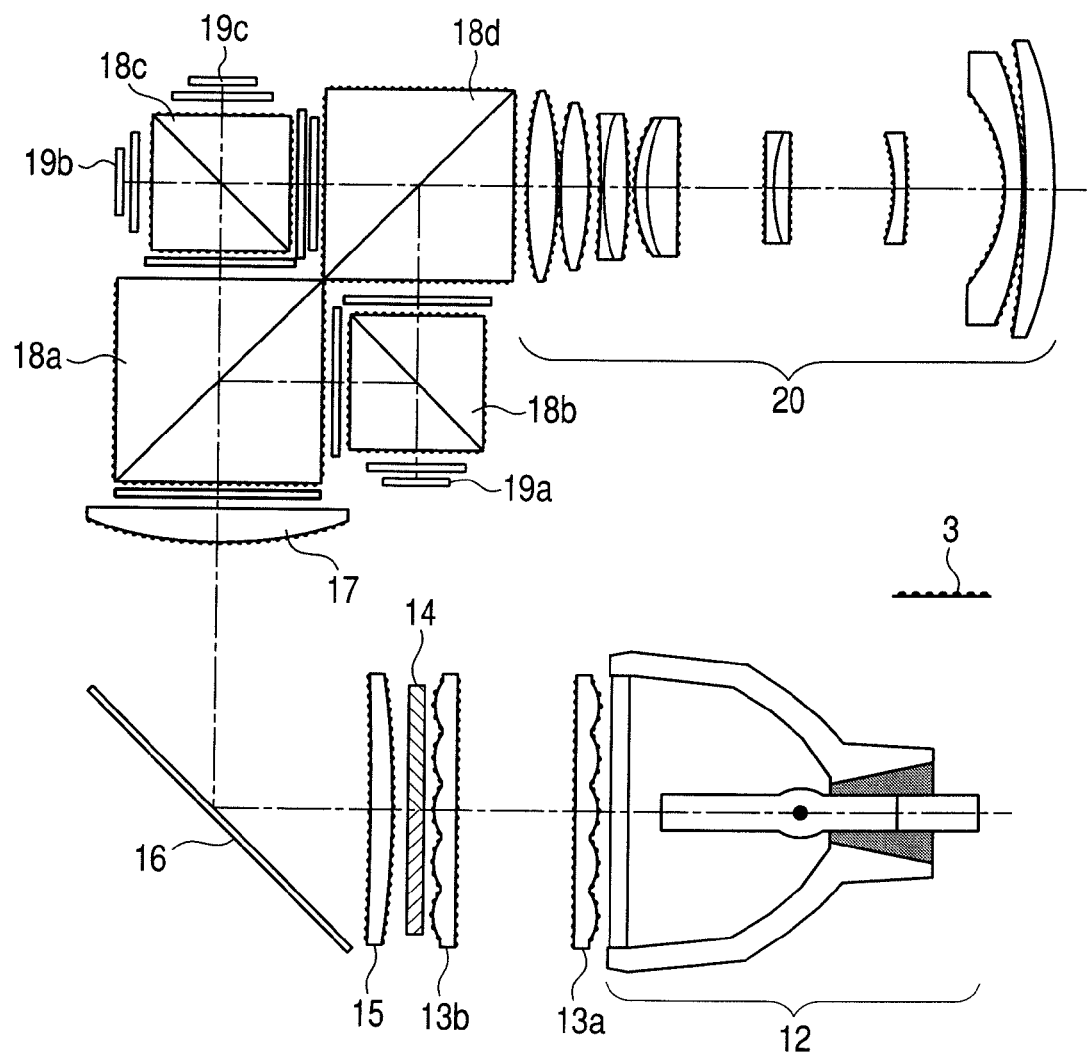
FIG. 16 is a cross-sectional view of Example 22 of the present invention.

An example in which the optical member of the present invention is used in a projection optical system (projector) is shown as Example 24 of the present invention. FIG. 16 illustrates a cross-section of a projector optical system.

In this figure, reference numeral 12 denotes a light source, reference numerals 13a and 13b denote fly eye integrators, reference numeral 14 denotes a polarizing conversion element, reference numeral 15 denotes a condenser lens, reference numeral 16 denotes a mirror, reference numeral 17 denotes a field lens, reference numerals 18a, 18b, 18c and 18d denote prisms, reference numerals 19a, 19b and 19c denote light modulation elements, and reference numeral 20 denotes a projection lens. In the figure, reference numeral 3 (shown with a legend) denotes an optical transparent element relating to the present invention. A layer containing an organic resin as a main component, and a layer having arranged plate crystals containing aluminum oxide as a main component are formed, and the outermost surface has an uneven profile, whereby reflection of light at each optical surface is reduced.

Because the optical member 3 of this example is configured to contain an inorganic component such as silica or alumina as a main component, the optical member 3 has a high heat resistance, and never suffers from a degradation in performance even if placed at a position 13a so close to the light source 12 that the optical member 3 is exposed to high heat.

Example 25

Figure 17:
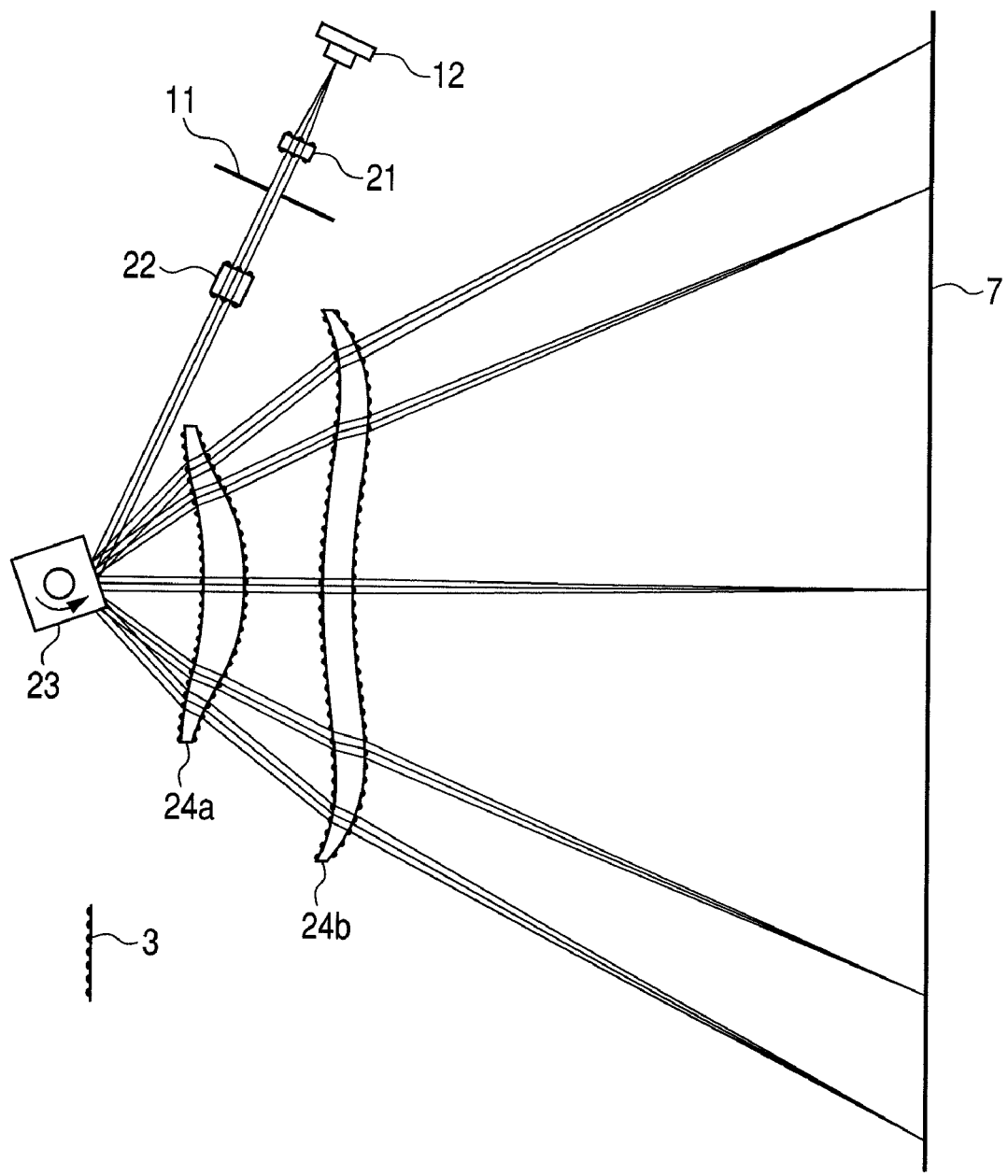
FIG. 17 is a cross-sectional view of Example 23 of the present invention.

An example in which the optical member of the present invention is used in a scan optical system (laser beam printer) is shown as Example 25 of the present invention. FIG. 17 illustrates a cross-section of a scan optical system.

In this figure, reference numeral 12 denotes a light source, reference numeral 21 denotes a collimator lens, reference numeral 11 denotes an aperture diaphragm, reference numeral 22 denotes a cylindrical lens, reference numeral 23 denotes a light deflector, reference numerals 24a and 24b denote fθ lenses, and reference numeral 7 denotes an image surface. In the figure, reference numeral 3 (shown with a legend) denotes an optical transparent element relating to the present invention. A layer containing an organic resin as a main component, and a layer having arranged plate crystals containing aluminum oxide as a main component are formed, and the outermost surface has an uneven profile, whereby reflection of light at each optical surface is reduced to realize formation of high-quality images.

The optical member of the present invention can be adapted to a transparent substrate having any refractive index, shows an excellent antireflection effect to visible light, and has a long-term weather resistance, and therefore it can be used for various kinds of displays of word processors, computers, televisions, plasma display panels, and the like; optical members such as polarizing plates of liquid crystal apparatuses, sunglass lenses, graduated eyeglass lenses, finder lenses for cameras, prisms, fly-eye lenses, toric lenses, various kinds of optical filters, sensors and the like, which are formed of various kinds of optical glass materials and transparent plastics; and further, photographic optical systems using those optical members, observation optical systems such as binoculars, projection optical systems for use in liquid crystal projectors, various optical lenses of scan optical systems for use in laser printers and the like, covers of various kinds of instruments, and window glasses of automobiles, electric trains, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-040003, filed Feb. 20, 2007, and Japanese Patent Application No. 2008-033290, filed Feb. 14, 2008 which are hereby incorporated by reference herein in their entirety.

What is claimed is:

1. A method of manufacturing an optical member, the method comprising:
    forming a layer containing a polyimide as a main component on a substrate by applying to the substrate a solution containing the polyimide;
    forming a layer containing aluminum oxide as a main component; and
    subjecting the layer containing aluminum oxide as a main component to hot water treatment to form unevenness on a surface,
    wherein the solution contains the polyimide dissolved in a solvent, the polyimide being obtained by polymerizing a dianhydride, a $-SiR_2-O-$ group-containing diamine, and at least one of an aromatic diamine and an aliphatic diamine, followed by imidization.

2. The method of claim 1, wherein the refractive index nb of the substrate, the refractive index ni of the layer containing the polyimide as a main component, and the refractive index ns of the layer containing aluminum oxide as a main component satisfy $nb \geqq ni \geqq ns$.

3. The method of claim 1, wherein the dianhydride comprises 4-(2,5-dioxotetrahydrofuran-3-yl)-1,2,3,4-tetrahydronaphthalene-1,2-dicarboxylic anhydride.

4. The method of claim 1, wherein $-SiR_2-O-$ group-containing diamine comprises 1,3-bis(3-aminopropyl)tetramethyldisiloxane.

5. The method of claim 1, wherein the aromatic diamine comprises one of 4,4'-bis(4-aminophenoxy)biphenyl and 2,2-bis[4-(4-aminophenoxy)phenyl]propane.

6. The method of claim 1, wherein the aliphatic diamine comprises 4,4'-diaminodicyclohexylmethane.

* * * * *